United States Patent [19]

Iwaihara et al.

[11] Patent Number: 5,693,110
[45] Date of Patent: Dec. 2, 1997

[54] PROCESSES FOR CONTROLLING OF THE TEMPERATURE OF GLASS INSIDE FOREHEARTH

[75] Inventors: Eiji Iwaihara; Motoo Kano, both of Osaka; Masahiro Konishi, Ichinomiya, all of Japan

[73] Assignees: OC Engineering Co., Ltd., Osaka-Fu; Ishizuka Glass Co., Ltd., Aichi Pref., both of Japan

[21] Appl. No.: 266,206

[22] Filed: Jun. 27, 1994

[30] Foreign Application Priority Data

Jun. 30, 1993 [JP] Japan ................ 5-162656

[51] Int. Cl.$^6$ .................................................. C03B 5/24
[52] U.S. Cl. ................. 65/29.11; 65/29.21; 65/135.1; 65/DIG. 13; 395/904
[58] Field of Search ............... 65/29.11, 29.21, 65/135.1, 162, 346, DIG. 13; 395/904

[56] References Cited

U.S. PATENT DOCUMENTS

| | | | |
|---|---|---|---|
| 3,915,682 | 10/1975 | Chotin et al. | 65/29 |
| 4,028,083 | 6/1977 | Patznick et al. | 65/29 |
| 4,375,369 | 3/1983 | Border et al. | 65/29 |
| 5,272,621 | 12/1993 | Aoki | 364/165 |
| 5,358,541 | 10/1994 | Kindall | 65/29.17 |

FOREIGN PATENT DOCUMENTS

| | | |
|---|---|---|
| 222287 | 5/1985 | Germany . |
| 2-138602 | 8/1990 | Japan . |
| 4-132628 | 5/1992 | Japan . |
| 2-256682 | 8/1992 | Japan . |
| 1738762 | 6/1992 | U.S.S.R. |
| 1738763 | 6/1992 | U.S.S.R. |
| 2 238 887 | 6/1991 | United Kingdom . |

*Primary Examiner*—Donald E. Czaja
*Assistant Examiner*—Sean Vincent
*Attorney, Agent, or Firm*—The Bell Seltzer Intellectual Property Group of Alston & Bird

[57] ABSTRACT

A process for controlling the temperature of glass inside a forehearth for the formation of gobs comprises the steps of: determining a set temperature of the glass in the zone No. 1 by effecting a fuzzy inference based on a preset membership function and a preset inference rule of a preset fuzzy set by using two variables, i.e., a deviation between a measured temperature and a set temperature of glass in the spout portion and a timevarying change amount between a temperature measured at a current measurement and a temperature measured at a previous measurement with respect to the glass in the spout portion, as an antecedence; determining a set temperature of the glass in each of zone Nos. 2 and 3 through a fuzzy inference based on a preset membership function and a preset inference rule of a preset fuzzy set through taking two variables, i.e., a deviation amount between a temperature of the glass measured in each of the zone Nos. 2 and 3 and a set temperature of the glass therefor and a time-varying change amount between a temperature measured at a current measurement and a temperature measured at a previous measurement, as an antecedence; and controlling an amount of a combustion gas through each burners by adjusting a set open degree of each cooling valve and a set value of the glass in each of the zone Nos. 1 through 3 based on the set temperatures determined.

64 Claims, 33 Drawing Sheets

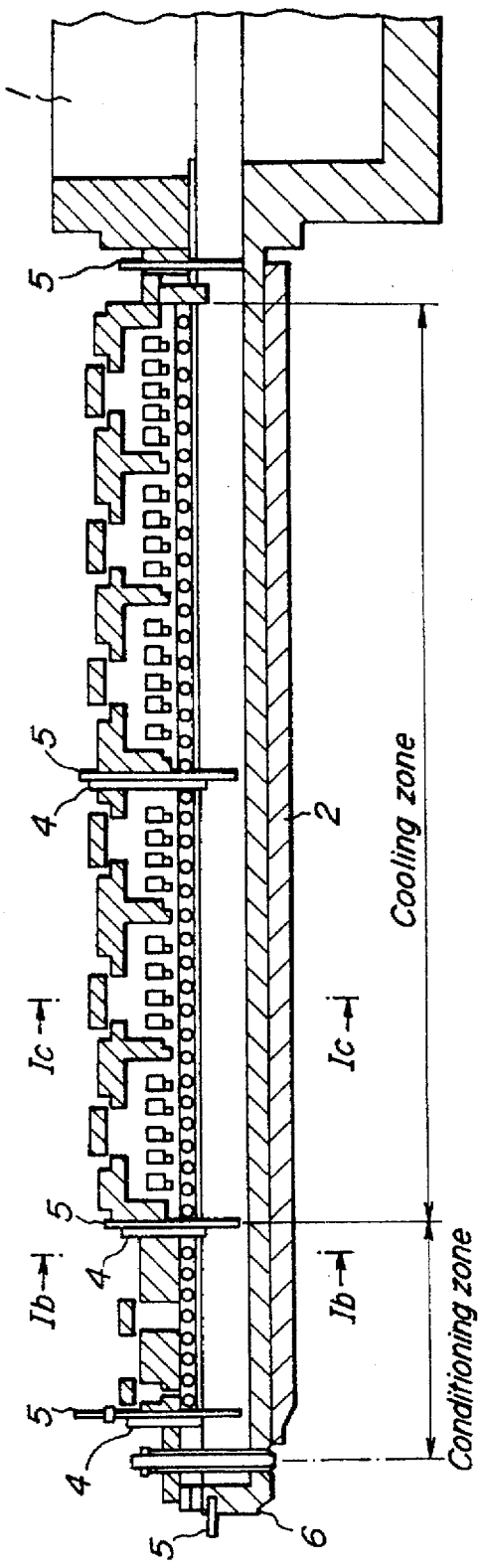
FIG_1a
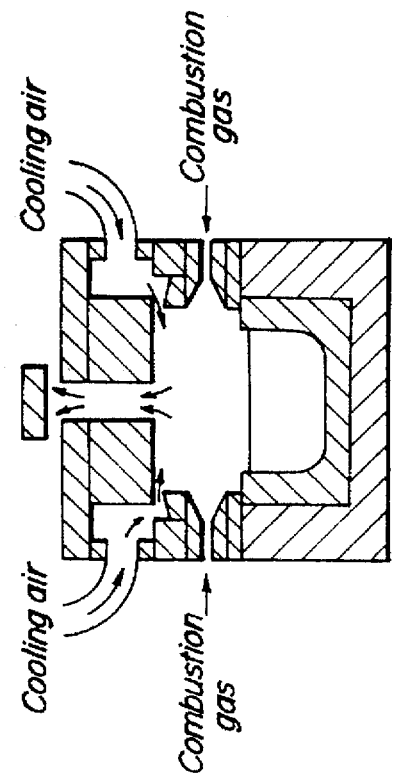
FIG_1b
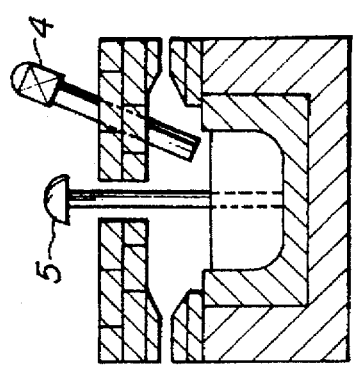
FIG_1c

FIG_5

Set temp.
(E)

Time-varying change rate
(ΔE)

FIG_11
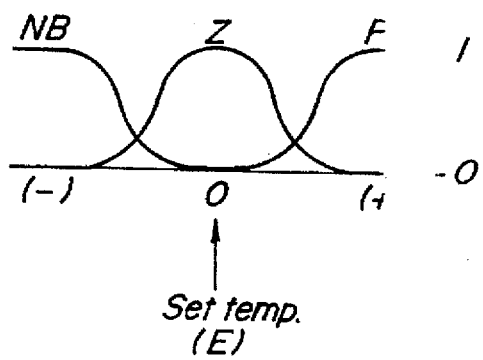
FIG_12
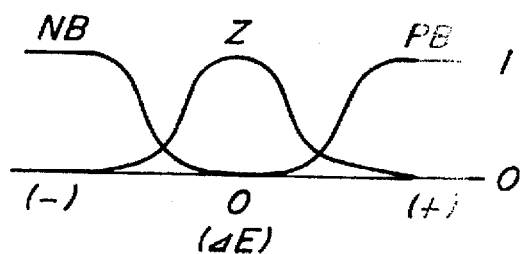
FIG_13
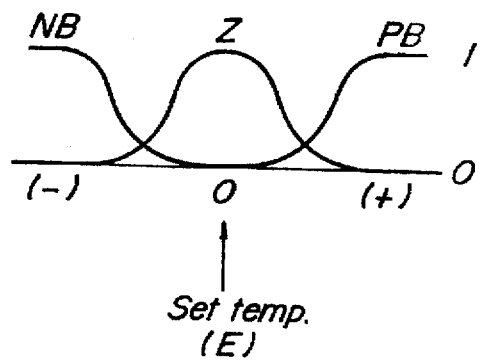
FIG_14
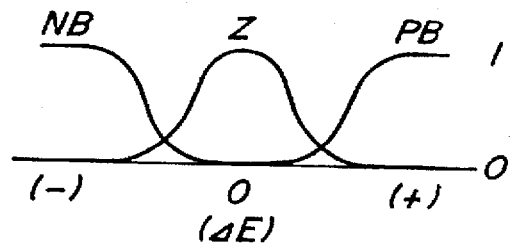

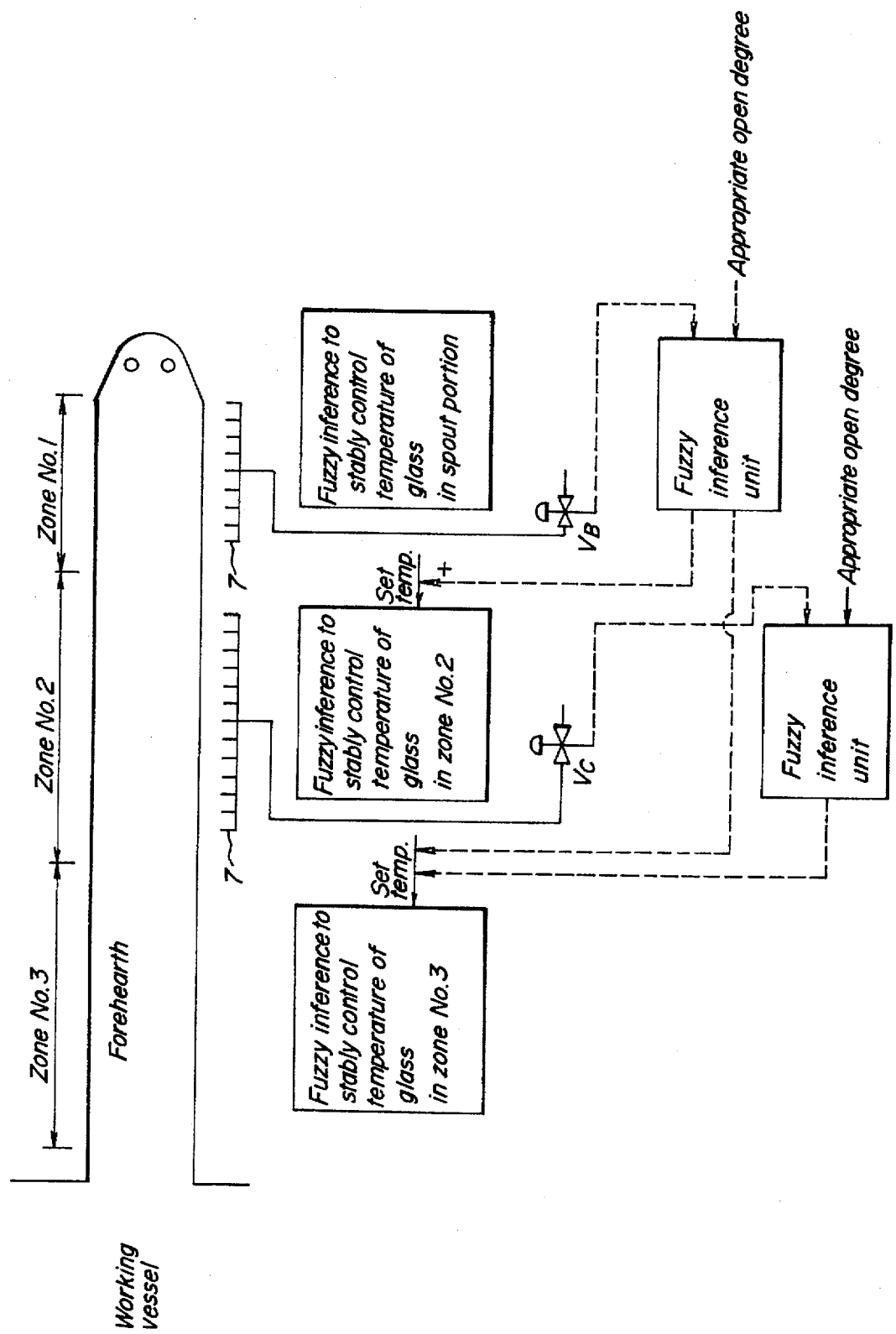

FIG_16
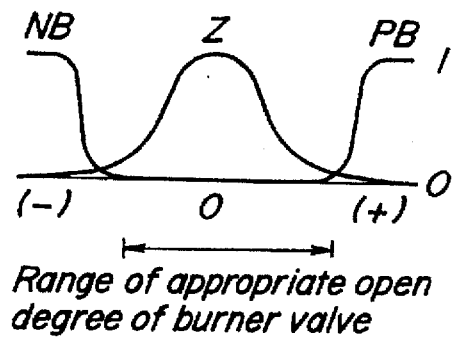
Range of appropriate open degree of burner valve
FIG_17
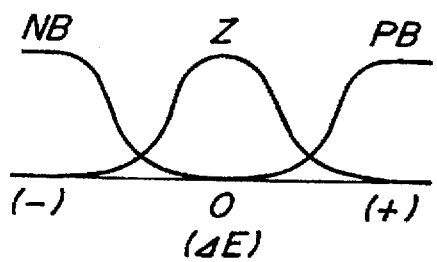
FIG_18
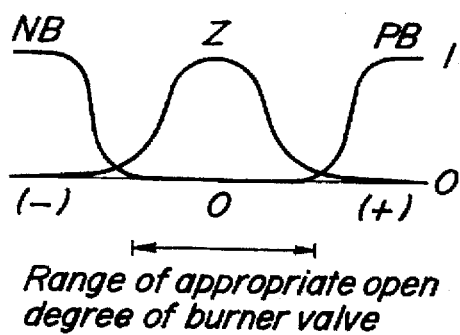
Range of appropriate open degree of burner valve
FIG_19
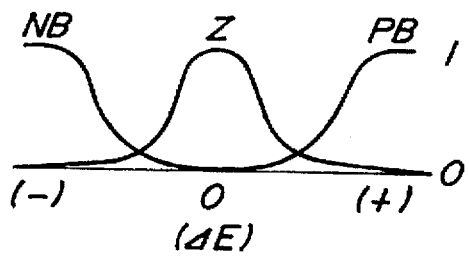

FIG_21
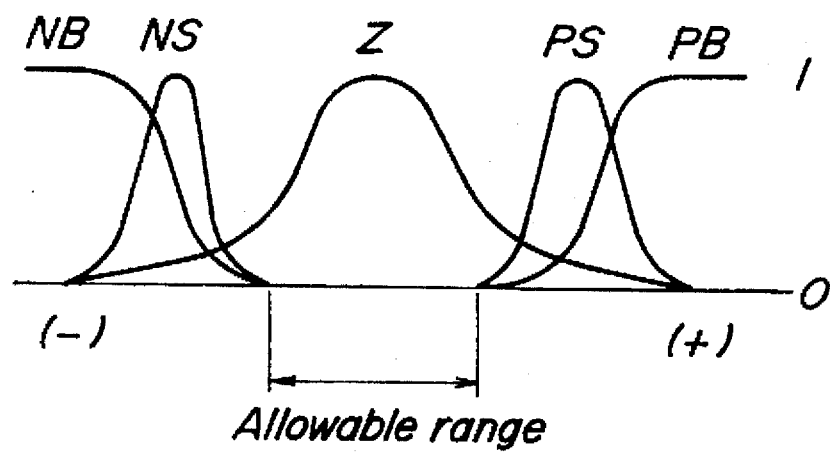
FIG_22
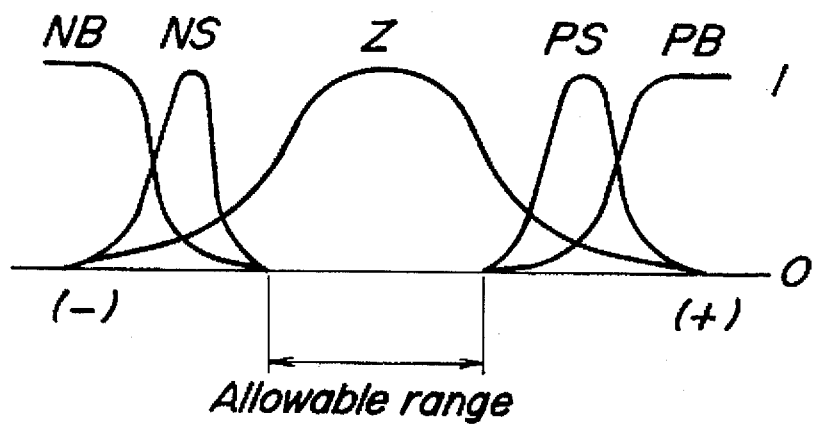

FIG_28
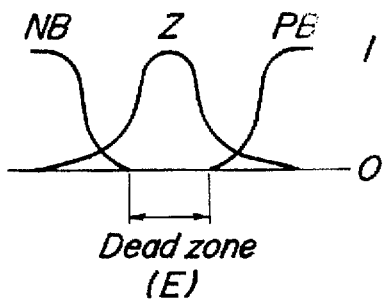
FIG_29
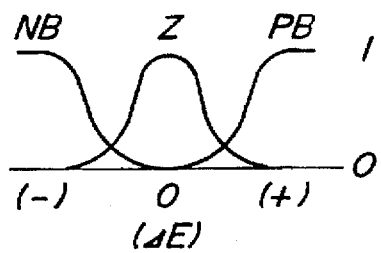
FIG_30
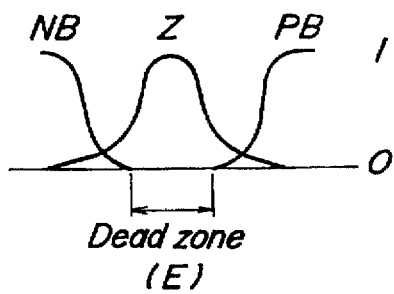
FIG_31
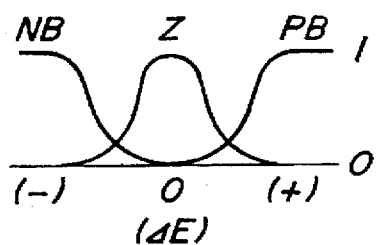

$T_3$: Temp. of glass in zone No.3
$T_2$: Temp. of glass in zone No.2
$T_1$: Temp. of glass in zone No.1
$S_1$: Temp. of glass in spout portion $J_3$: Changing temp. of glass in zone No.3
$J_2$: Changing temp. of glass in zone No.2
$J_0$: Changing job

FIG_38
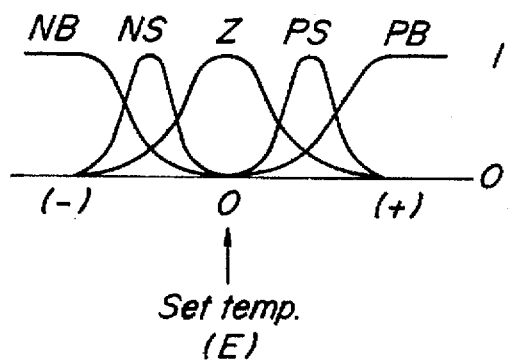
FIG_39
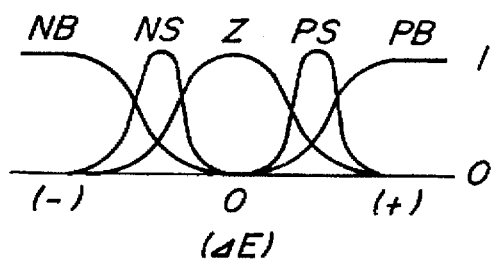
FIG_40
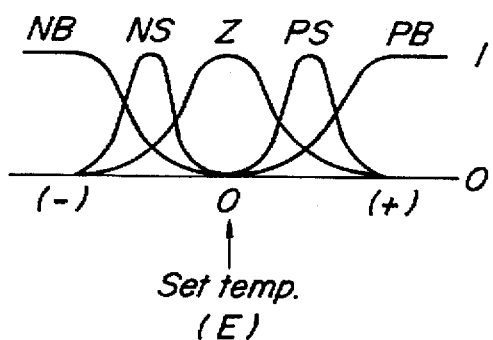
FIG_41
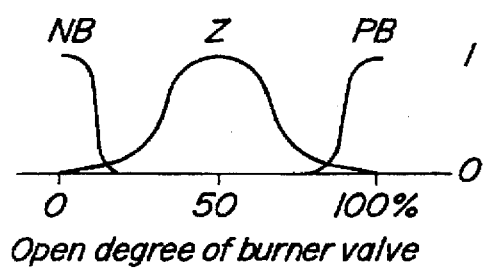

FIG_42
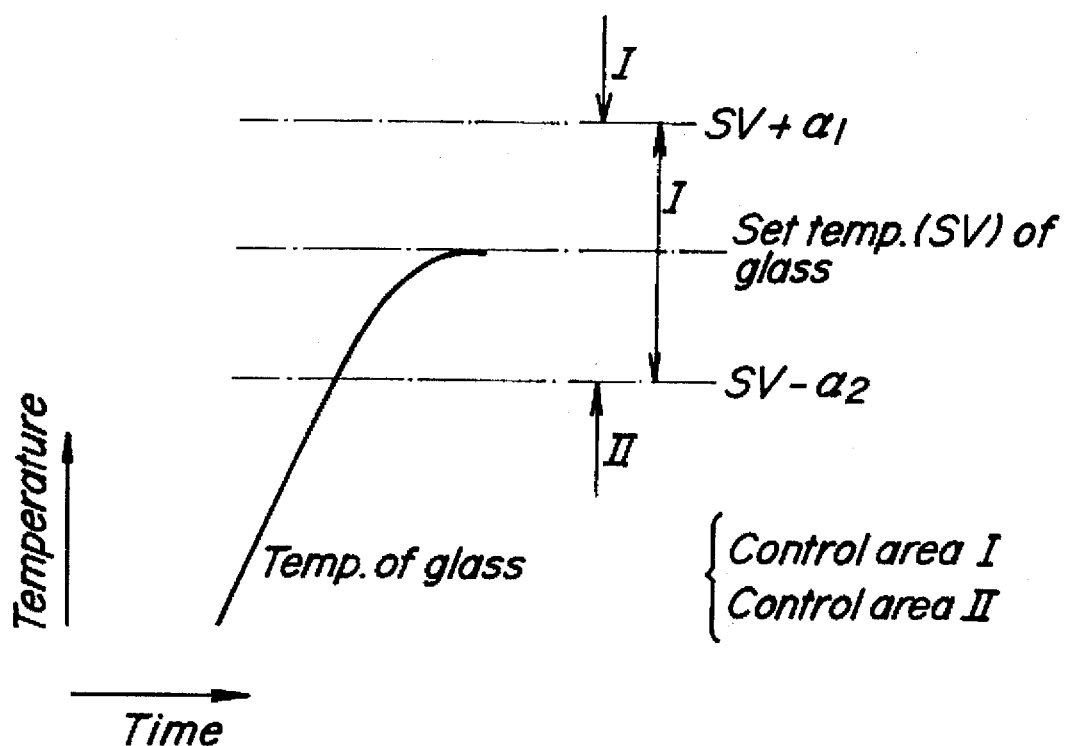

FIG_44
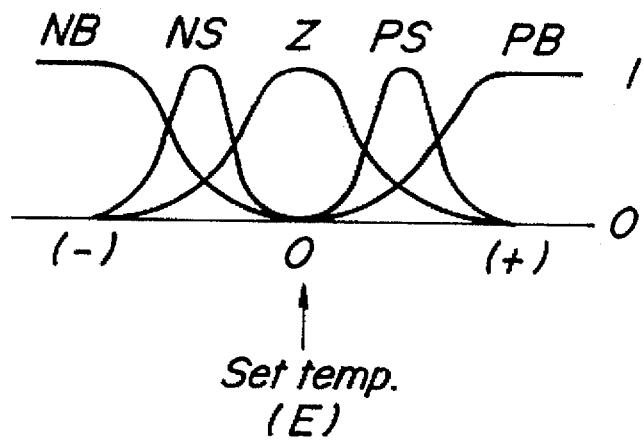
Set temp. (E)
FIG_45
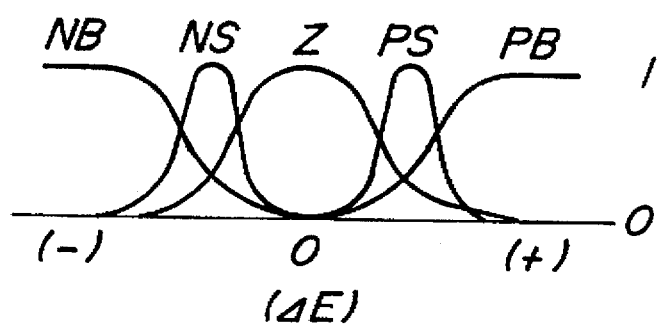
(ΔE)
FIG_46
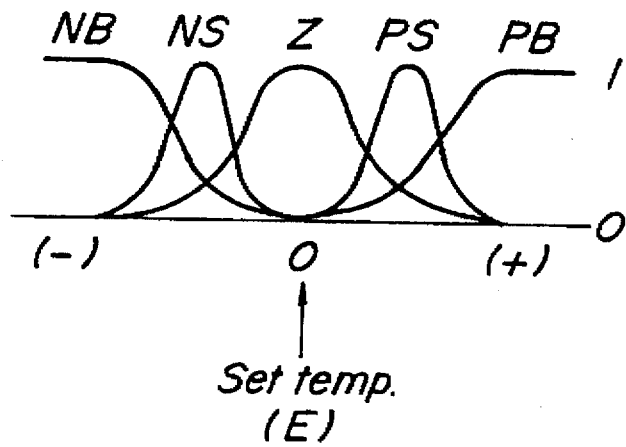
Set temp. (E)

FIG_47
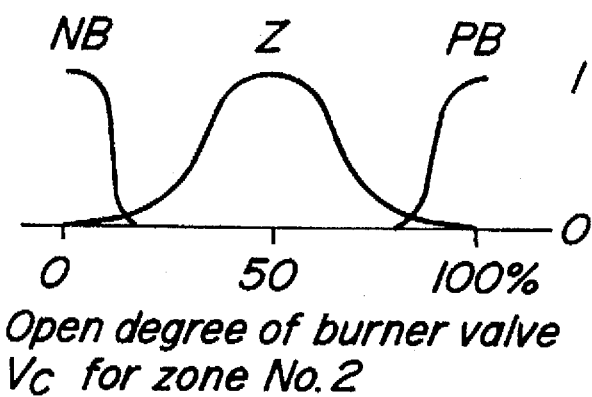
Open degree of burner valve
$V_C$ for zone No. 2
FIG_48
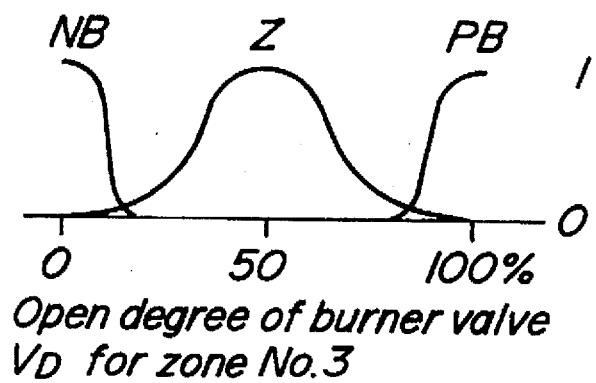
Open degree of burner valve
$V_D$ for zone No. 3

Open degree of burner valves

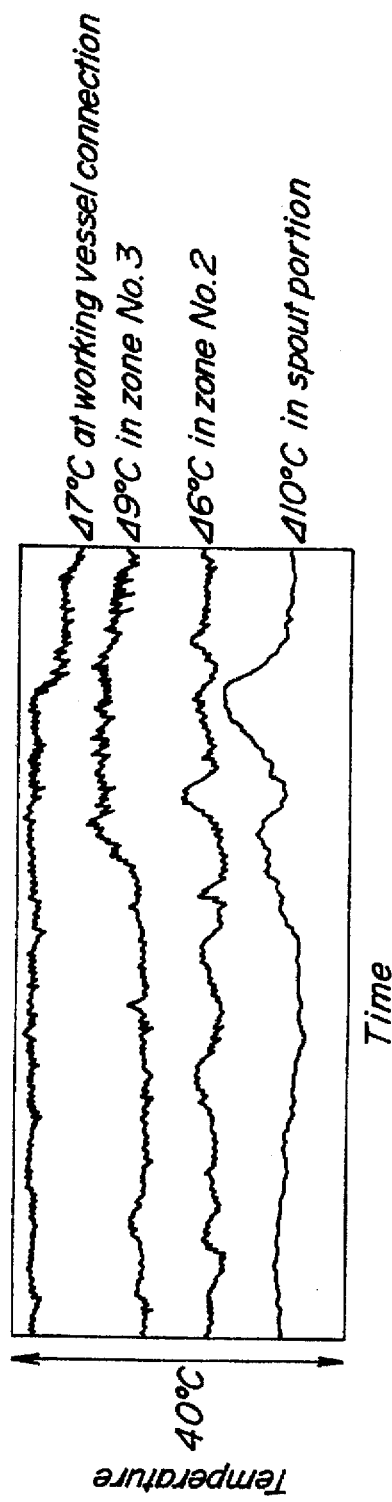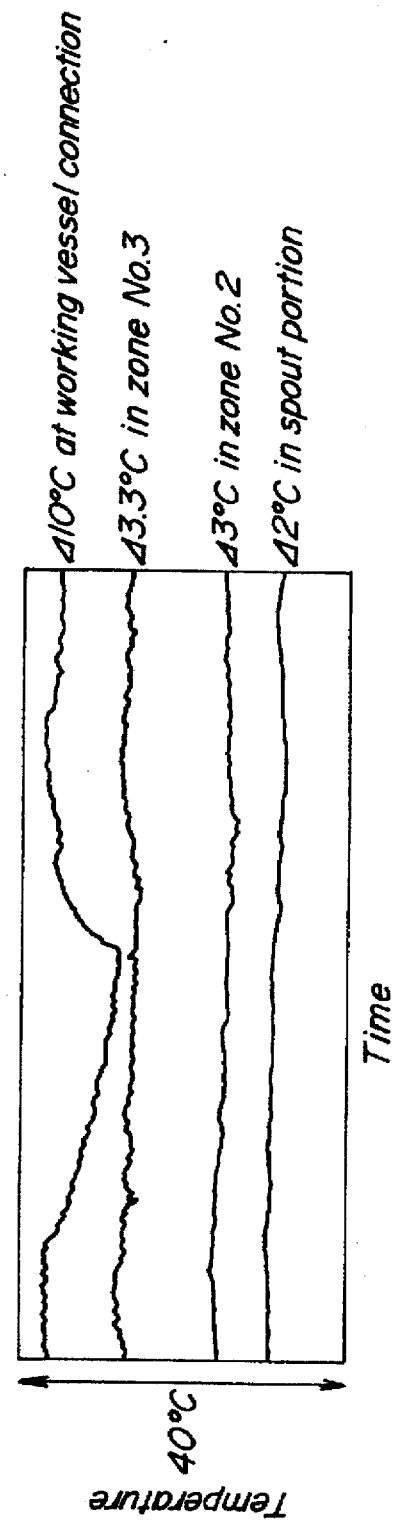

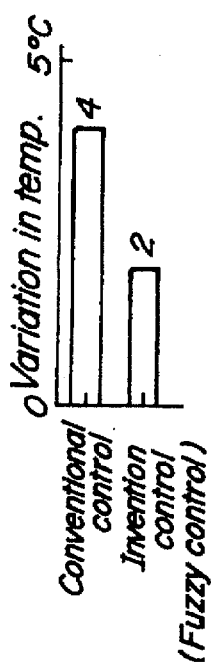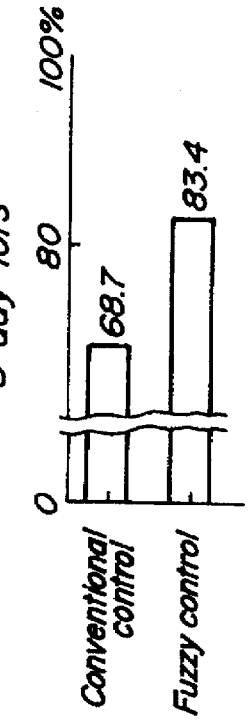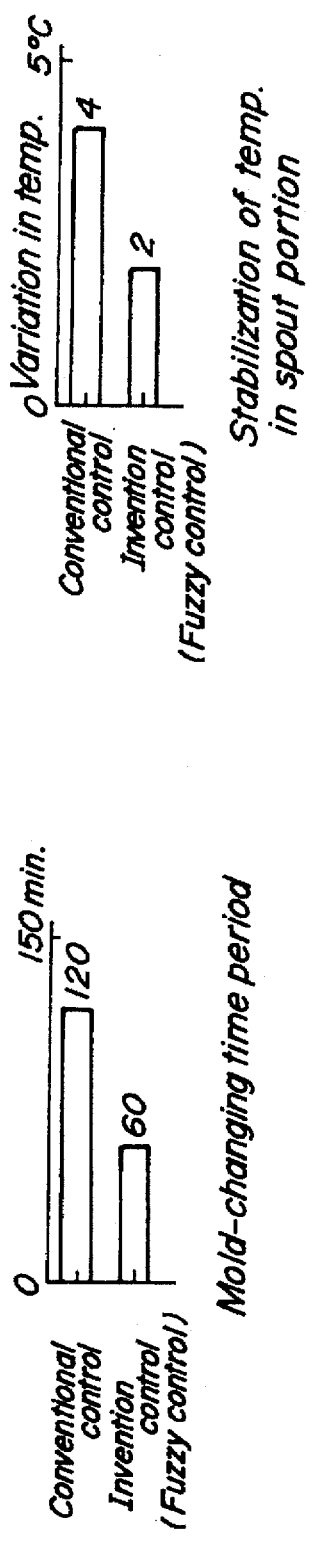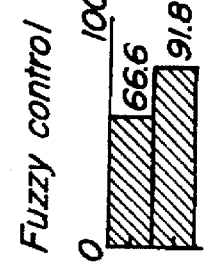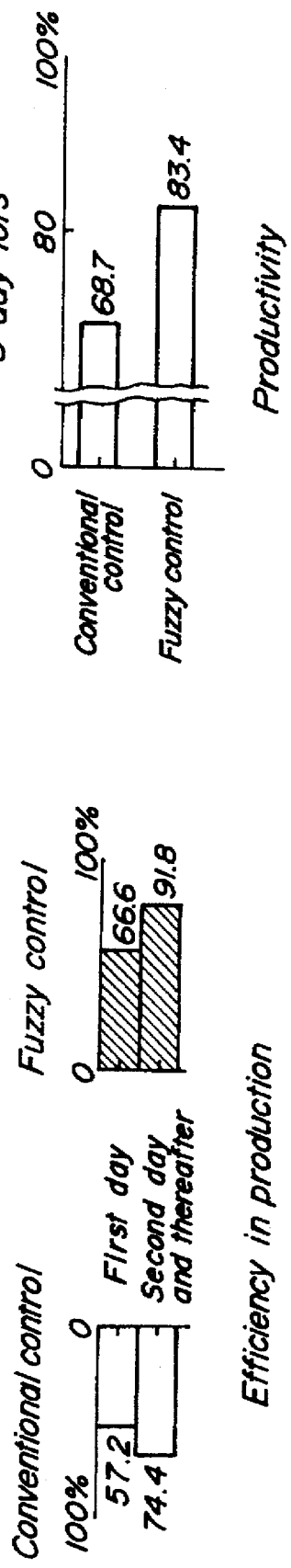
FIG_54

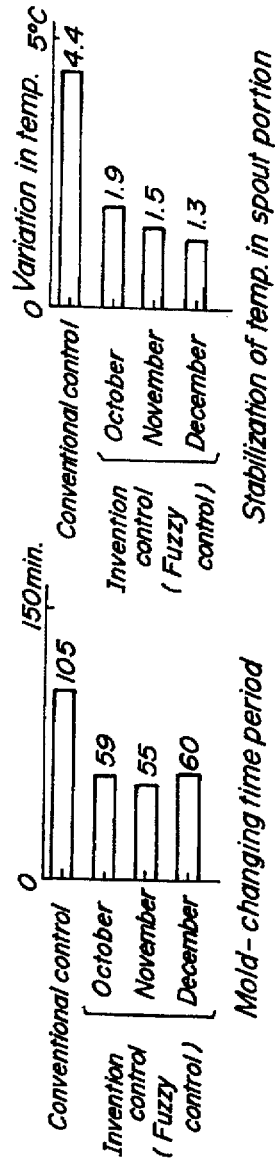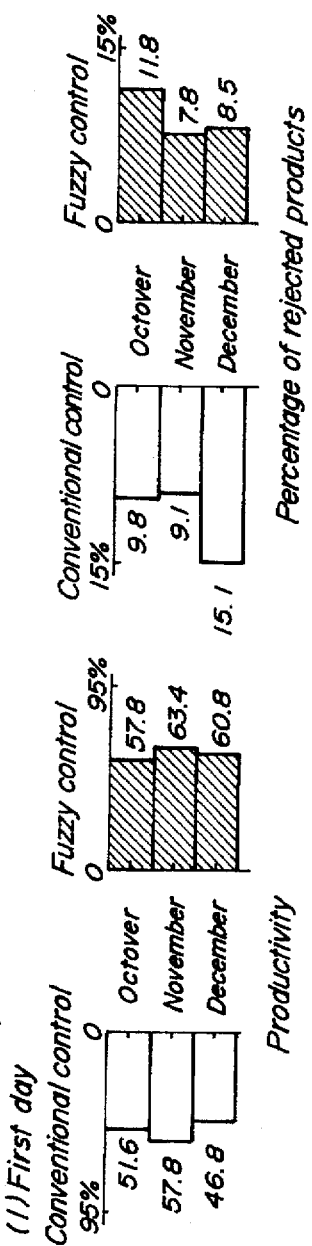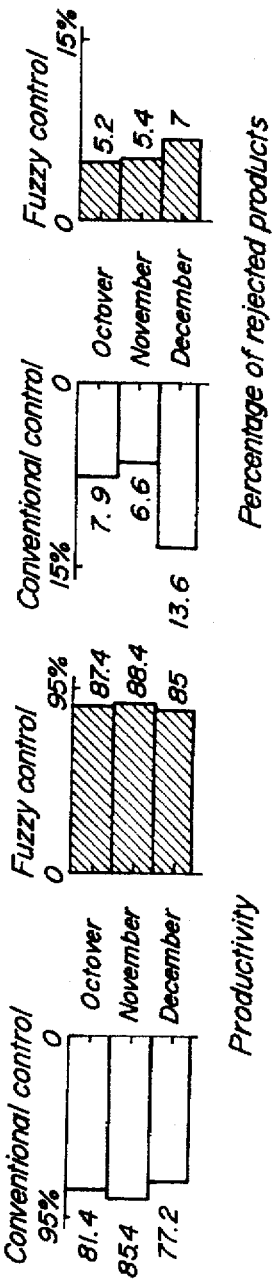
FIG. 55

PROCESSES FOR CONTROLLING OF THE TEMPERATURE OF GLASS INSIDE FOREHEARTH

BACKGROUND OF THE INVENTION

(1) Field of the Invention

The present invention relates to processes for controlling the temperature of glass in a forehearth so that changes may be effected in a short time between different kinds of glass articles requiring different temperatures of gobs during the production of the glass articles, while the temperature of the gobs for the glass articles to be currently being produced is stably maintained.

(2) Related Art Statement

In the general forehearth to be used for the production of glass articles, temperatures, etc. are measured by using measuring instruments such as radiation thermometers, and automatic control is effected through regulating the open degree of burners and the flow rate of cooling air so that the temperature of the gobs may not substantially change until the current production of a kind of the current glass articles is terminated.

In general, the temperature of the glass in each zone of the forehearth is measured, and the automatic controlling is effected by the feed back type PID control so that the temperature of the the glass surface may be kept constant.

Recently, controlling using the feed forward/feed back control in combination has been proposed.

In the process characteristics for the temperature of the glass inside the forehearth, the waste time and the time constant are great, there are many externally disturbing factors, and the process dynamic largely change when the flow-out rate of the glass is changed. Accordingly, effective temperature-controlling techniques have not been established yet.

Up to now, there has been no controlling technique to change the glass articles having different temperatures of gobs in a short time. Such a changing operation must be relied upon judgment and operation of skillful operators. It inevitably takes a long time to stabilize the temperature of the gobs to an intended gob temperature depending upon experiences of the operator when the temperature target is changed. Therefore, even if working for changing kinds of articles on a side of a molding machine is completed, the production of new glass articles may not be started because the temperature of the gobs does not reach a target temperature. In general, the time required for changing the kinds of glass articles in the molding machine is about 60 minutes on the average, whereas the time for stabilizing the temperature of gobs to an intended level is about 100 minutes on the average.

When the temperature of the gobs during the production is automatically controlled by the PID control based on the feed back control, influences due to external disturbance cannot be completely eliminated. The temperature of the glass in a spout portion of the forehearth varies within a temperature range of ±2° C., which is near a change rate of the temperature of the gob. Changes in the temperature of the gobs cause changes in the weight of the gobs (weight of products). In the worst case, this causes poor molding, and the production line is adversely affected. Even if the feed forward/feed back control is used in combination, satisfactory control results are difficult to easily obtain, since a long wasteful time peculiar to the production with the forehearth necessitates a wasteful time-compensating function, although the influence due to the external disturbance is prevented to some extent. In order to improve the control technique, the controlling measure must be re-constructed from the beginning, and a large number of steps are required to perfect a new controlling measure. Even if such a controlling measure is accomplished, tuning needs to be effected from the beginning and this technique is impractical, when the controlling measure is to be applied to another forehearth having a different type or when the forehearth is partially or entirely reconstructed due to aging even if the type is the same.

SUMMARY OF THE INVENTION

The temperature of the glass in the forehearth is conventionally controlled as mentioned above, and the present invention has been accomplished to solve the above-mentioned problems of the prior art. The invention is to provide a process for controlling the temperature of the forehearth, wherein the temperature of the glass in the forehearth can be accurately and easily controlled by a fuzzy control system using empirical judgment of the skillful operation and operator-operating steps as control rules.

The present invention is also provide a process for accurately and easily controlling the temperature of the glass in the forehearth by a multiple variable type fuzzy control system in which limitation conditions regarding the regulation of the temperature of the glass inside the forehearth are incorporated into control rules.

In order to accomplish the above object, the present invention relates to a process for controlling the temperature of glass inside a forehearth for the formation of gobs by feeding, to a feeder, glass melted in a glass-melting furnace through a working end adjacent the glass-melting furnace and the forehearth provided with burning means, said process including the steps of:

(a) dividing the forehearth into at least three zones Nos. 1, 2 and 3, said zone No. 1 being a conditioning zone, and said zone Nos. 2 and 3 being cooling zones;

(b) forming a spout portion at an end portion of said zone No. 1;

(c) providing cooling means at opposite sides of each of said zone Nos. 2 and 3;

(d) measuring the temperature of glass in said spout portion with a thermometer arranged therein;

(e) measuring the temperature of the glass in each zone with a plurality of thermometers arranged in the zone;

(f) determining a set temperature of the glass in the zone No. 1 by effecting a fuzzy inference based on a preset membership function and a preset inference rule of a fuzzy set by using two variables, i.e., a deviation between a measured temperature and a set temperature of glass in the spout portion and a time-varying change amount between a temperature measured at a current measurement and a temperature measured at a previous measurement with respect to the glass in the spout portion, as an antecedence;

(g) determining a set temperature of the glass in each of the zone Nos. 2 and 3 through a fuzzy inference based on a preset membership function and a preset inference rule of a preset fuzzy set through taking two variables, i.e., a deviation between a temperature and a set temperature of the glass measured in each of the zone Nos. 2 and 3 and a time-varying change amount between a temperature measured at a current measurement and a temperature measured at a previous measurement with respect to the glass in the zone Nos. 2 and 3, as an antecedence; and (h) controlling an amount of a combustion gas through each burner by adjusting a set open degree of each cooling valve and a set temperature of the glass in each of the zone Nos. 1 through 3 based on the set temperatures determined in (f) and (g).

Another aspect of the present invention relates to a process for controlling the temperature of glass inside a forehearth for the formation of gobs by feeding, to a feeder, glass melted in a glass-melting furnace through a working end adjacent the glass-melting furnace and the forehearth provided with combustion means, said process including the steps of:

(a) dividing the forehearth into at least three zones Nos. 1, 2 and 3, said zone No. 1 being a conditioning zone, and said zone Nos. 2 and 3 being cooling zones;

(b) forming a spout portion at a tip of said zone No. 1;

(c) providing cooling means at opposite sides of each of said zone Nos. 2 and 3;

(d) measuring the temperature of a glass in the spout portion with a trilevel thermocouple arranged in said spout portion;

(e) measuring the temperature of the glass surface in a downstream portion of each zone with a glass surface thermometer arranged therein;

(f) measuring the temperature of the glass with a plurality of trilevel thermocouples arranged in each zone;

(g) determining a set temperature of the glass surface in the zone No. 1 by effecting a fuzzy inference based on a preset membership function and a preset inference rule of a fuzzy set by using two variables, i.e., a deviation between a measured temperature and a set temperature of the glass in the spout portion and a time-varying change amount between a temperature measured at a current measurement and a temperature measured at a previous measurement with respect to the glass in the spout portion, as an antecedence;

(h) determining a set temperature of the glass surface in each of the zone Nos. 2 and 3 through a fuzzy inference based on a preset membership function and an inference rule of a preset fuzzy set through taking two variables, i.e., a deviation between a temperature of the glass measured in each of the zone Nos. 2 and 3 and a set temperature therefor and a time-varying change amount between a temperature measured at a current measurement and a temperature measured at a previous measurement with respect to the glass in the zone Nos. 2 and 3, as forehead requisites an antecedence; and (i) controlling an amount of a combustion gas through each burner by adjusting a set open degree of each cooling valve and a set temperature of the glass at each of the zone Nos. 1 through 3 based on the set temperatures of the glass surface in the zone Nos. 1 through 3 determined in the above (g) and (h).

The following are preferable in the process of the present invention. The following may be employed in any combination.

(1) The process of the present invention is characterized in that a fuzzy inference is effected based on a deviation between the open degree of the burners of the zone No. 1 and an appropriate open degree thereof, and a time-varying change amount between the currently measured temperature and the previously measured temperature of the glass surface in the zone No. 1, and the change amount of the set temperature of the glass in the zone Nos. 2 and 3 is controlled accordingly, whereas a fuzzy inference is effected based on a deviation amount between the open degree of the burners and an appropriate open degree thereof in the zone No. 2 and a time-varying change amount between the currently measured temperature and the previously measured temperature of the glass surface in the zone No. 2, and a change amount of the temperature of the glass in the zone No. 3 is controlled.

(2) Inside the zone No. 1 is arranged a trilevel thermocouple for measuring temperatures of the glass flowing in upper, intermediate and lower positions, respectively. The temperatures of the glass are measured at these positions, a fuzzy inference is effected based on a difference in the temperature of the glass between the upper position and the intermediate position and on a difference in the temperature of the glass between the upper position and the lower position, and a change amount of the set temperature of the glass in each of the zone Nos. 2 and 3 is controlled.

(3) A fuzzy inference is effected based on deviations between measured temperatures and set temperatures and a time-varying change amount between the currently measured temperature and the previously measured temperature with respect to the temperature of the glass in the spout portion and the zone Nos. 1 through 3, and a change amount in the set temperature of the glass surface in each of the zones is controlled accordingly.

(4) A fuzzy inference is effected based on change amounts in the set temperature of the glass in each of the spout portion and the zone Nos. 2 and 3, a deviation amount between the measured temperature of the glass and the set temperature thereof in each of the spout portion and the zone Nos. 1–3, and ① when the set temperature of the spout portion is changed, the change amounts of the set temperatures of the glass in the zone Nos. 2 and 3 are controlled, and the change amount of the set temperature of the glass surface in the zone No. 1 is controlled, whereas ② when the set temperature of the zone No. 2 is changed, the change amount of the set temperature of the glass surface in the zone No. 2 is controlled, and ③ when the set temperature in the zone No. 3 is changed, the change amount of the set temperature of the glass surface in the zone No. 3 is controlled.

(5) The process of the present invention includes a first control area (I) and a second control area (II). In the first control area (I), a fuzzy inference is effected based on a deviation between the measured temperature and the set temperature of the glass in the spout portion, and the time-varying change amount between the currently measured temperature of the glass and the previously measured temperature in the spout portion. In the second control area (II), manipulating amounts are continuously outputted to the PID controller when the temperature of the glass in the spout portion largely differs from the set temperature. In the first control area (I), the temperature of the glass in the spout portion is subjected to a fuzzy inference based on a deviation amount between the measured temperature and the set temperature and a time-varying change amount of a difference between the currently measured temperature and the previously measured temperature with respect to the glass in the spout portion. In the second control area (II), the temperature of the glass in the spout portion is subjected to a fuzzy inference based on the deviation between the measured temperature and the set temperature of the glass in the spout portion and the open degree of burner valves in the zone No. 1. A change amount of the set temperature of the glass surface in the zone No. 1 is controlled based on the results of the fuzzy inferences.

(6) The process of the present invention includes a first control area (I) and a second control area (II). In the first control area (I), the temperatures of the glass in the zone Nos. 2 and 3 are subjected to a fuzzy inference based on a deviation between the measured temperature and the set temperature of the glass in each of the zone Nos. 2 and 3 and the time-varying change amount between the currently measured temperature and the previously measured temperature of the glass in each of the zone Nos. 2 and 3. In the second control area (II), manipulating amounts are continuously outputted to the PID controller when the temperature of the glass in each of the zones 1 to 3 largely differs from the set temperature thereof. In the first control area (I), the temperature of the glass in each of the zone Nos. 2 and 3 is subjected to a fuzzy inference based on a deviation between the measured temperature and the set temperature and a time-varying change amount of a difference between the currently measured temperature and the previously measured temperature with respect to the glass in the spout portion. In the second control area (II), the temperature of the glass in each of the zone Nos. 2 and 3 is subjected to a fuzzy inference based on a deviation between the measured temperature and the set temperature of the glass and the open degree of the burner valves in each of the zone Nos. 2 and 3. In the first control area (I), the change amount of the set temperature of the glass surface in each of the zone Nos. 2 and 3 is controlled. In the second control area (II), change amount of the set temperature of the glass surface in each of the zone Nos. 2 and 3 is controlled.

(7) Cooling means are provided on opposite sides of each of the zone Nos. 2 and 3, respectively, and a fuzzy inference is effected based on a deviation between the open degree of the burner valves in each of the zones and an appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

These and other objects, features and advantages of the invention will be understood when taken in conjunction with the attached drawings.

BRIEF DESCRIPTION OF THE DRAWINGS

For a better understanding of the invention, reference is made to the drawings, wherein:

FIG. 1(a) is a sectional view of a forehearth for effecting the process of the present invention, FIGS. 1(b) and 1(c) being sectional views of the forehearth taken along a line Ib—Ib and a line Ic—Ic in FIG. 1(a), respectively;

FIGS. 11, 12, 13 and 14 illustrate membership functions;

FIG. 15 is a view for schematically illustrating a process for correcting the manipulating amount for the burners in zone Nos. 1 and 2;

FIGS. 16, 17, 18 and 19 are views for illustrating membership functions;

FIGS. 21 and 22 illustrate membership functions;

FIGS. 24, 25, 26, 27, 28, 29, 30 and 31 illustrate membership functions;

FIGS. 38, 39, 40 and 41 illustrate membership functions;

FIGS. 42 and 43 are views for schematically illustrating processes for effecting control to stabilize the temperature of the glass in respective zones in a shorter time;

FIGS. 44, 45, 46, 47 and 48 illustrate membership functions;

FIG. 52(a) is a view for illustrating control data (conventional control data) for stabilizing the temperature in the spout portion during the ordinary production, and FIG. 52(b) is a view for illustrating control data (invention system control data) for stabilizing the temperature in the spout portion during the ordinary production;

FIG. 54 shows comparison results in controlling between before and after operation of the invention system (Article A); and FIG. 55 shows comparison results in controlling between before and after operation of the invention system (per month).

DETAILED DESCRIPTION OF THE INVENTION

The entire construction of the forehearth for effecting the process of the present invention will be explained.

Figure 2:
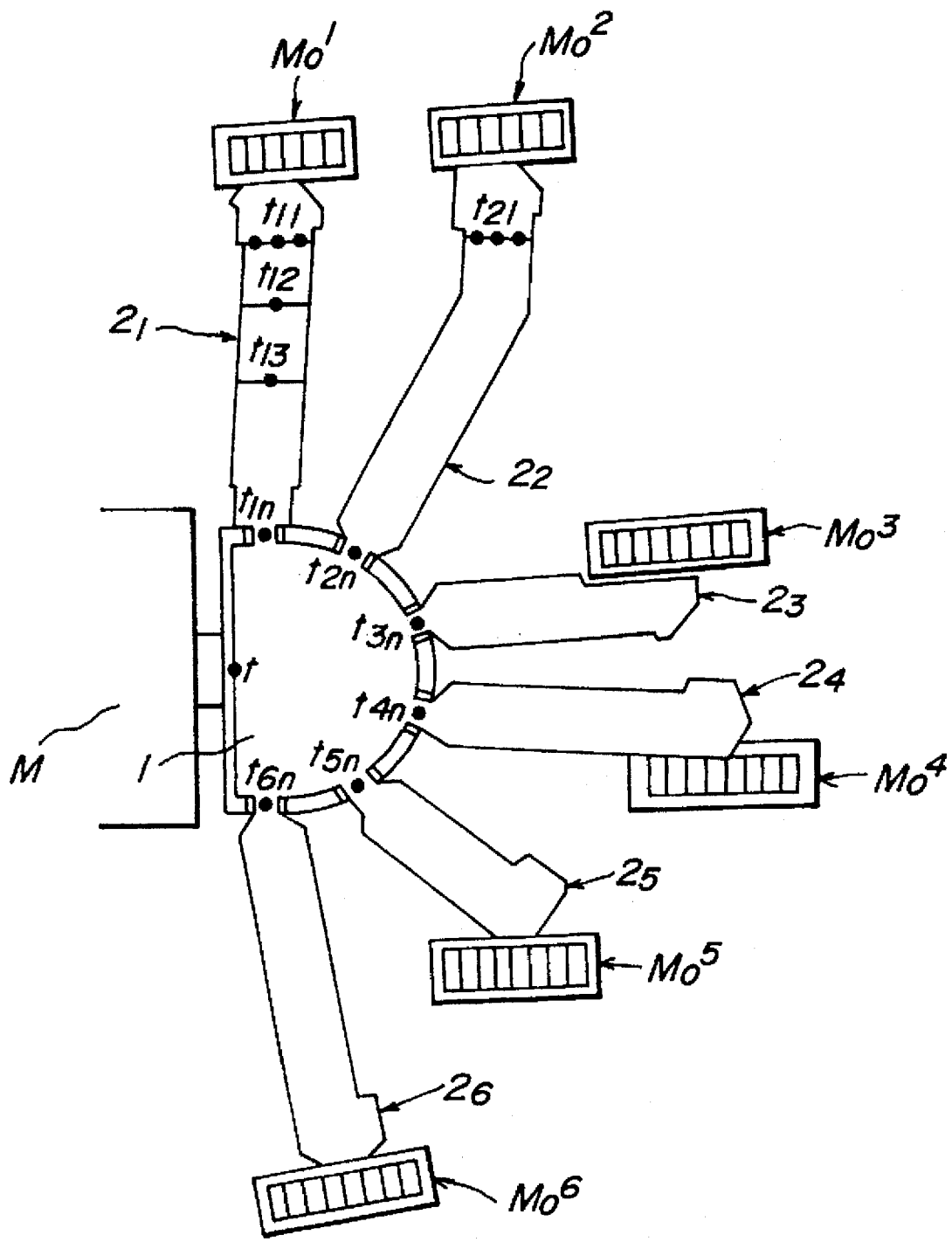
FIG. 2 is a view for schematically illustrating arrangement of forehearth systems for effecting the process of the present invention.
Figure 3:
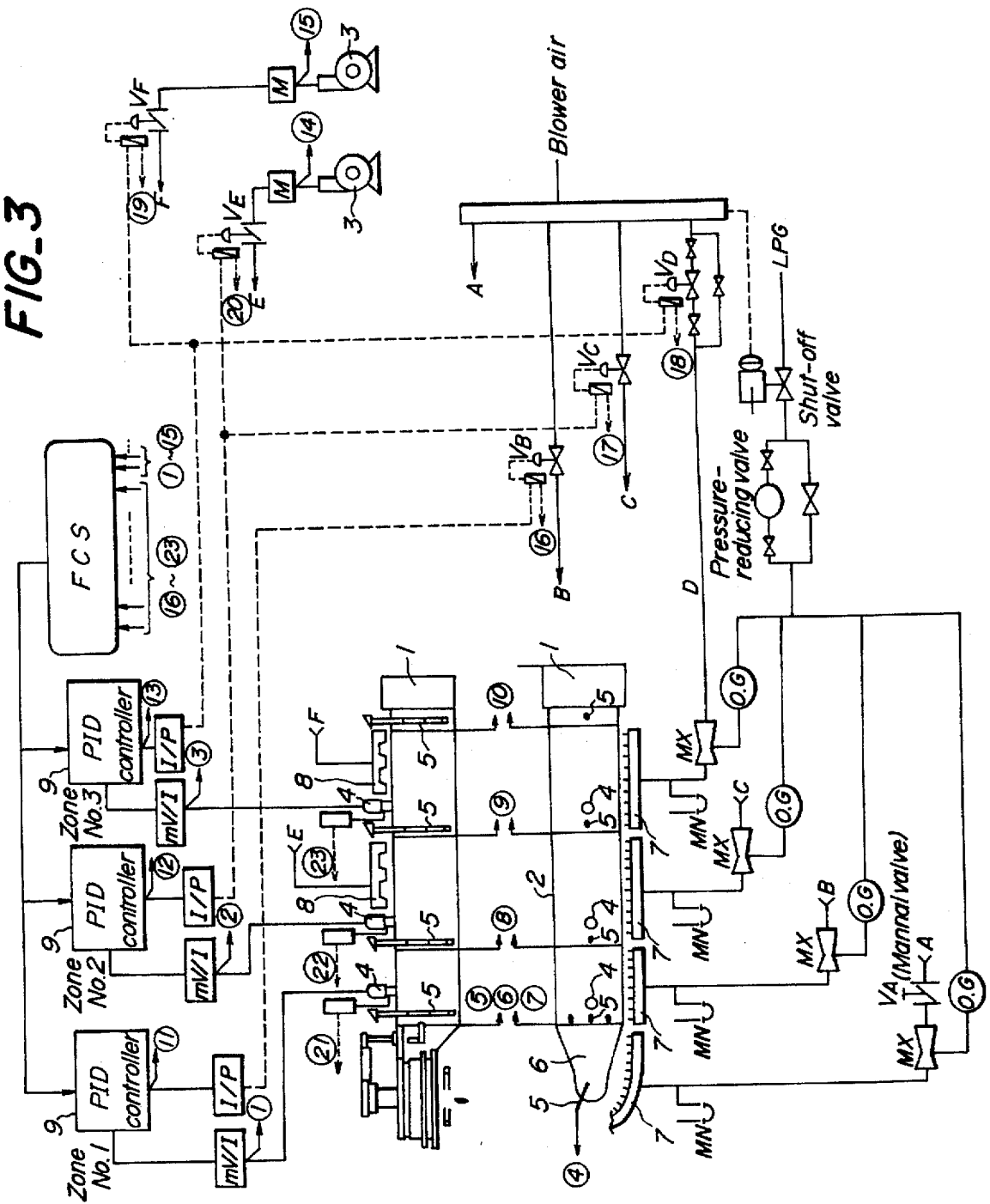
FIG. 3 is a diagram for schematically illustrating the entire control system for a temperature controller for effecting the process of the present invention.

Referring to FIGS. 1 through 3, a glass melted in a glass melting furnace M is flown into a forehearth 2 through a working end 1 upstream the forehearth. The forehearth 2 includes a conditioning zone No. 1 and cooling zone Nos. 2 and 3 as shown. In the cooling zone Nos. 2 and 3, high temperature glass (about 1200° C.) entering the forehearth is cooled near to a gob temperature (about 1150°-about 1100°). In conditioning zone No. 1, the glass cooled in the zone Nos. 3 and 2 is further cooled uniformly. Cooling air is blown into the zone Nos. 2 and 3 by means of respective cooling blowers 3 through cooling control valves $V_E$ and $V_F$ as dampers. The flow rate of cooling air into the cooling zone through each cooling blower is regulated by adjusting cooling control valve $V_E$, $V_F$. In FIG. 3, an air inlet port is designated by a reference numeral 8.

LPG is fed as a fuel to branched lines for respective zone Nos. 1-3 and a spout portion 6 in which a zero governor (OG) and a mixer (MX) are arranged. Air is introduced into each mixer (MX) through an air feed line A, B, C or D. To each mixer (MX) is connected, through a manometer MN, a burner manifold 7 in which plural burners are arranged. The manometer measures the pressure of a mixed gas of air and the fuel gas. In each zone, the burners are provided of which the rate of the combustion gas is controlled independently. Radiation thermometer 4, 4 are arranged in a downstream side of each zone to measure the temperature of the glass surface in the zone. The flow rate of a combustion gas is regulated by a PID controller 9 provided for each zone, based on a difference between measured and set glass surface temperatures in each zone.

Further, a trilevel thermocouple 5 or trilevel thermocouples 5 are arranged in each of the zone Nos. 1-3 and the spout zone. By so constructing, stabilization of the temperature of the glass, which is as one of the objects of the controlling process of the present invention, can be effected through inputting signals (④-⑩) from the trilevel thermocouples 5, 5 to a fuzzy control system (FCS). As data to be inputted for effecting the controlling process of the present invention, the temperature of the glass surface, the open degree of the burner valves $V_A$-$V_D$, the open degree of the cooling valves $V_E$ and $V_F$ (cooling dampers), etc. may be recited besides the temperature of the glass According to the controlling process of the present invention, a manipulator effects a fuzzy inference, and outputs set values for PID controllers for the respective zones, set open degrees for the cooling valves for the zone Nos. 2 and 3, and set temperatures of the glass in the zone Nos. 1, 2 and 3 as inference results obtained by effecting a fuzzy inference.

Explanation will be made on a case where the two cooling zones No. 2 and 3 are provided, but same may be applied to a case where additional zone or zones (zone No. 4, . . . ) are provided. In that case, it is a matter of course that combustion burners and other necessary instruments are provided for such an additional zone or zones.

Further, as shown in FIG. 2, a plurality of forehearths (six forehearths in FIG. 2) may be provided and connected to a single melting furnace M through a working end 1. In that case, not only a single kind of article but also different kinds of articles can be simultaneously produced. (In FIG. 2, $M_o^1$-$M_o^6$ are molding assemblies).

When thermometers $t_{1n}$, $t_{2n}$, $t_{3n}$, $t_{4n}$, $t_{5n}$, and $t_{6n}$ are provided at locations where the forehearths $2_1$-$2_6$ are connected to the working end 1, external changes in temperature of the glass including that in the adjacent forehearths can be assuredly grasped by these thermometers. Consequently, the temperature of the gobs can be maintained in a stable state as desired through appropriately coping with such external changes.

In FIG. 3, symbols ①-㉓ denote flows of outputs/inputs with respect to the measuring instruments (4, 5, electromagnetic valves, motors), converters (mV/I, I/P), PID controllers, the fuzzy control system (FCS), etc.

Controlling blocks for effecting the fuzzy control in the present invention will be first explained.

Figure 4:
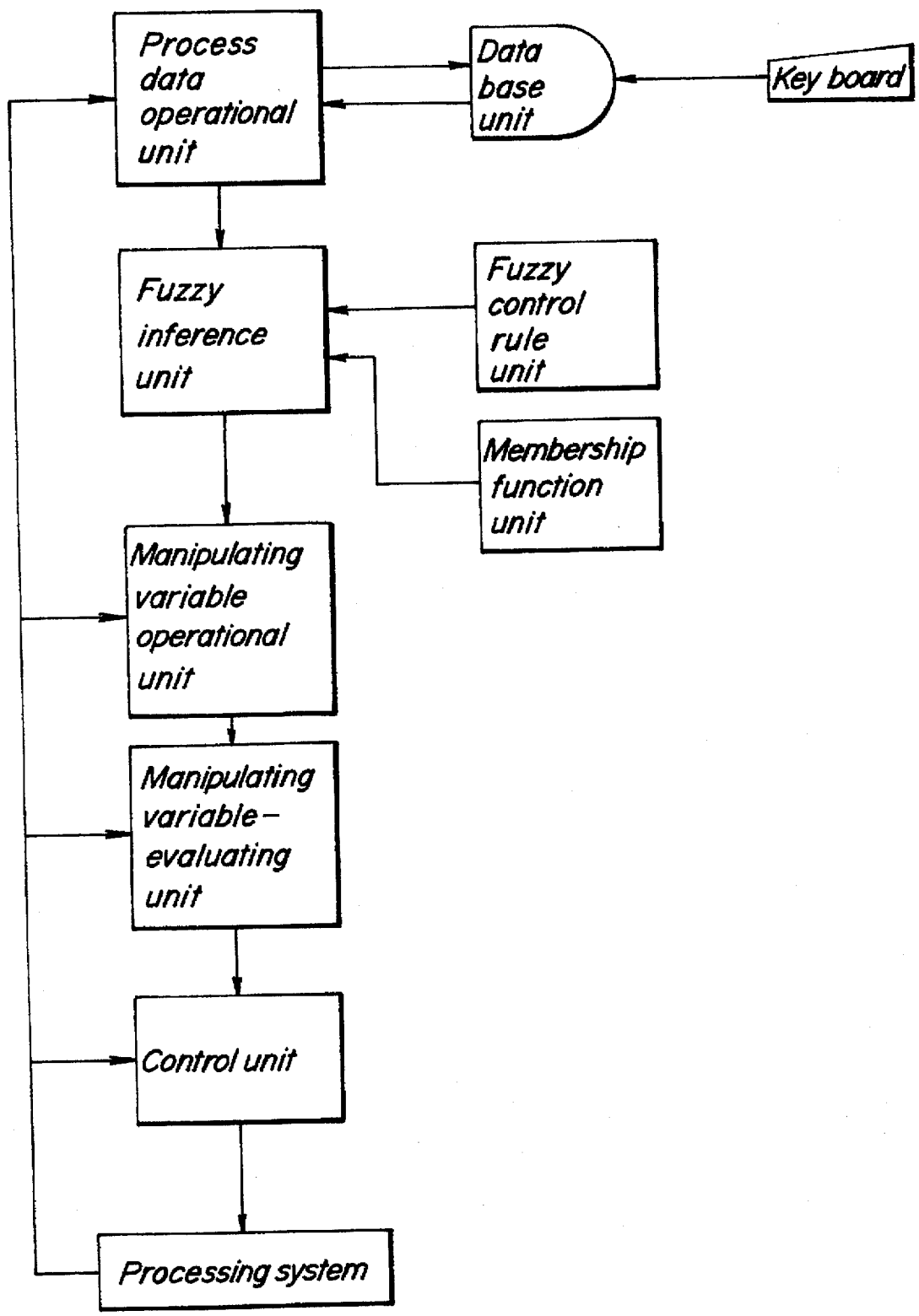
FIG. 4 is a block diagram for schematically illustrating a fuzzy control system.

In FIG. 4 is schematically illustrated a control block diagram for effecting the fuzzy control in the present invention. The control block diagram includes a keyboard, a data base, a process data operational unit, a fuzzy inference unit, a fuzzy control rule unit, a membership function unit, a manipulating variable operational unit, a manipulating variable evaluating unit, a control unit, and the process system shown in FIG. 1-3. These blocks are connected as shown in FIG. 4.

The process data operational unit receives the temperature of the glass, the temperature of the glass surface, the open degree of the burner valve, and the open degree of the cooler valve from the process system, and calculates deviations between received data and set temperatures and set open degrees of the valves stored in the data base unit, time-varying change rates between measured values at a current measurement time and measured values at a previous measurement time, etc.

The fuzzy inference unit effects the fuzzy inference based on data received from the process data operational unit, and membership functions and control rules corresponding thereto.

The manipulating variable operational unit converts qualitative manipulating variables obtained by effecting the fuzzy inferences to quantitative variables.

When a plurality of inference rules are used, a change variable ($\Delta U$) of the manipulating variable is determined by a weighted-mean method at a value of the membership function. The manipulating variable evaluating unit adds the thus obtained variable or change amount ($\Delta U$) of the manipulating variable to the manipulating variable at the current time, and evaluates whether the added sum falls in a predetermined range or not. If it is evaluated that the sum falls in the predetermined range, the value is fed to the control unit, which outputs a signal to the process system.

Signals are fed back to the processing data operational unit, the fuzzy inference unit, the manipulating variable operational unit, the manipulating variable-evaluating unit, and the control unit.

Figure 5:
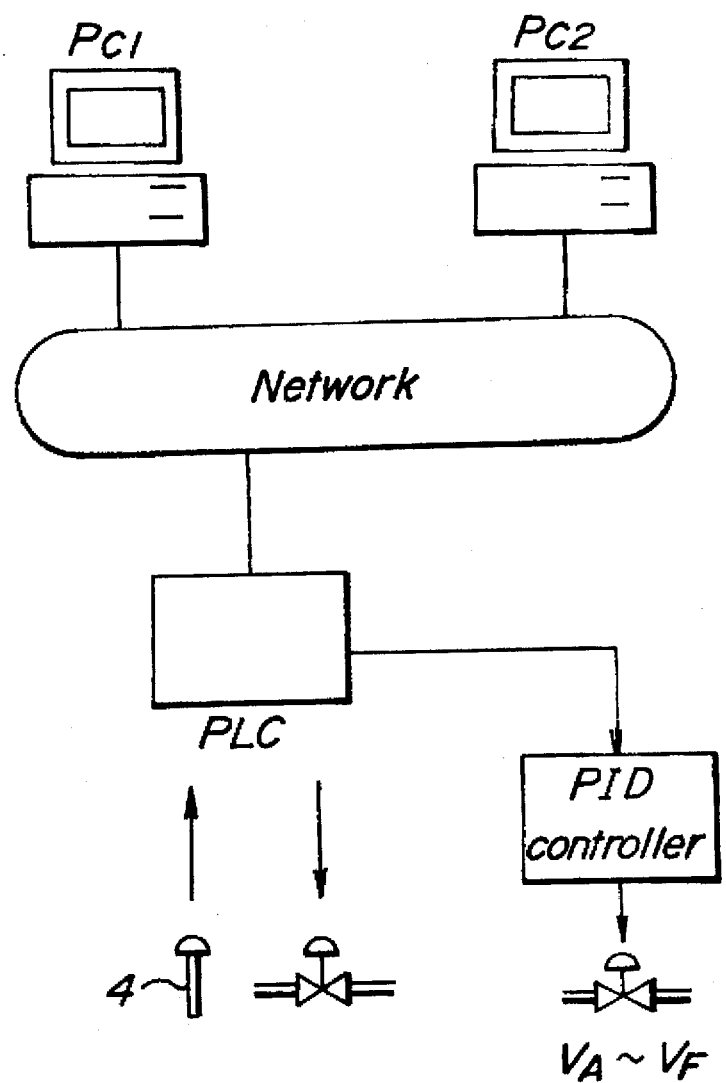
FIG. 5 is a view for schematically illustrating constituent units of the control system.

In practicing the controlling process of the present invention, a system is constituted by instruments schematically illustrated in FIG. 5. Input signals and output signals relative to the process system are inputted to or outputted from personal computers ($PC_1$, $PC_2$) through a programing logic controller (hereinafter abbreviated as "PLC") and a network. FCS includes $PC_1$, $PC_2$, PLC and the network.

Main functions of the PC are broadly classified into the following.

1. Controlling and filtering data
2. Effecting fuzzy inferences and preliminarily setting and changing data
3. Setting items for job changing
4. Man-machine interracial function Among a group of the data inputted to the PC through the PLC and the network, principal data, such as the temperature of the glass and the temperature of the glass surface, to be used for effecting the controlling are subjecting to filtering by the moving-averaging processing.

Figure 6:
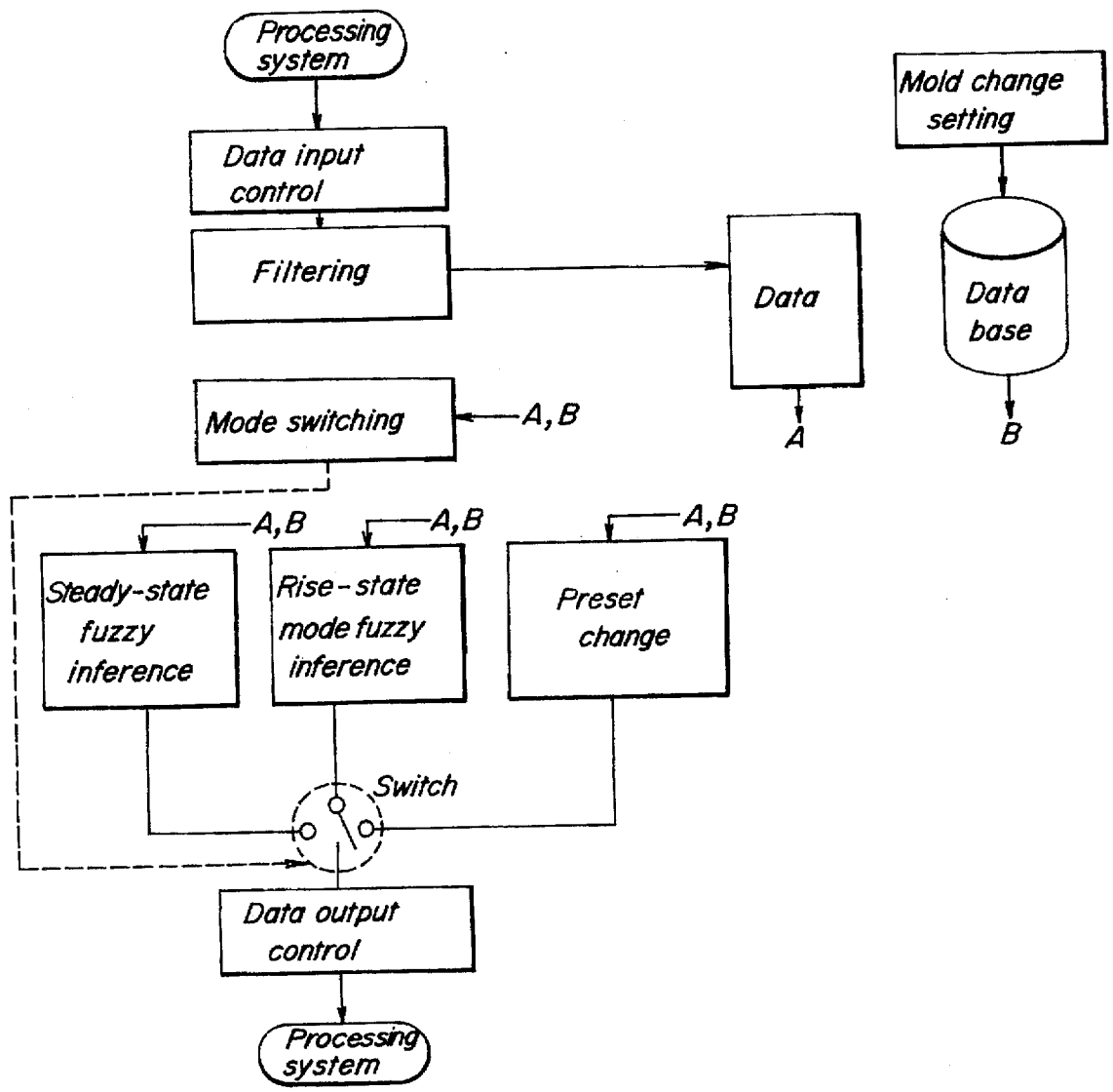
FIG. 6 is a view for schematically illustrating a control mode-switching system.

As shown in FIG. 6, the fuzzy inferring unit effects fuzzy inference in a steady-state mode and fuzzy inference in a rise-state mode based on filtered data. Switching is automatically effected between these two modes depending upon the operating state of the process.

Since data such as a control set point, parameters and alarm set points (upper and lower limits), etc. vary depending upon kinds of glasses to be produced, such data are preliminarily recorded and stored as data base. In setting the items for job changing, it is possible to set points of times for job changing for glasses to be currently and succeedingly produced, and to call data base for the glasses. See FIG. 6.

The PC further possesses the following functions in addition to the above ones.

5. Monitoring operation through graphic image or overview image
6. Alarming
7. DDC (Direct digital control)
8. graphically displaying trend
9. Logging data In the following, the fuzzy controlling in the steady state and the fuzzy controlling in the time of rise setting will be explained in detail in separate sections [I] and [II].

[I] Fuzzy controlling in steady state

The fuzzy controlling in the steady state has the following control loops.

(A) Stably controlling the temperature of the glass in the spout portion
(B) Stably controlling the temperature of the glass in the zone Nos. 2 and 3
(C) Controlling to correct operational variables in the zone Nos. 1 and 2
(D) Controlling to make uniform the temperature of the glass in the zone No. 1
(E) Controlling to cope with external disturbance (A) Stably controlling the temperature of the glass in the spout portion This is a control loop for stabilizing the temperature of the glass at a constant temperature in the spout portion functioning as a gob-forming portion at the most downstream portion of the forehearth so that the temperature of the gobs may be stabilized. In this control loop, a deviation is calculated between a preset temperature of the temperature of the glass in the spout portion and the temperature of the glass measured in the spout portion at a current time, and a deviation is calculated between the temperature of the glass measured in the spout portion at the current time and the temperature of the glass measured in the spout portion at a previous time. Thereby, a time-varying change rate is determined.

Two variables, i.e., the deviation in the the temperature of the glass and the time-varying change rate are subjected, as an antecedence to the fuzzy inference according to a membership function and an inference rule preset for a fuzzy set. Thereby, a set temperature of the glass surface in the zone No. 1 is determined.

The thus determined set temperature is fed to the PID controller for automatically controlling the temperature of the glass surface.

Figure 7:
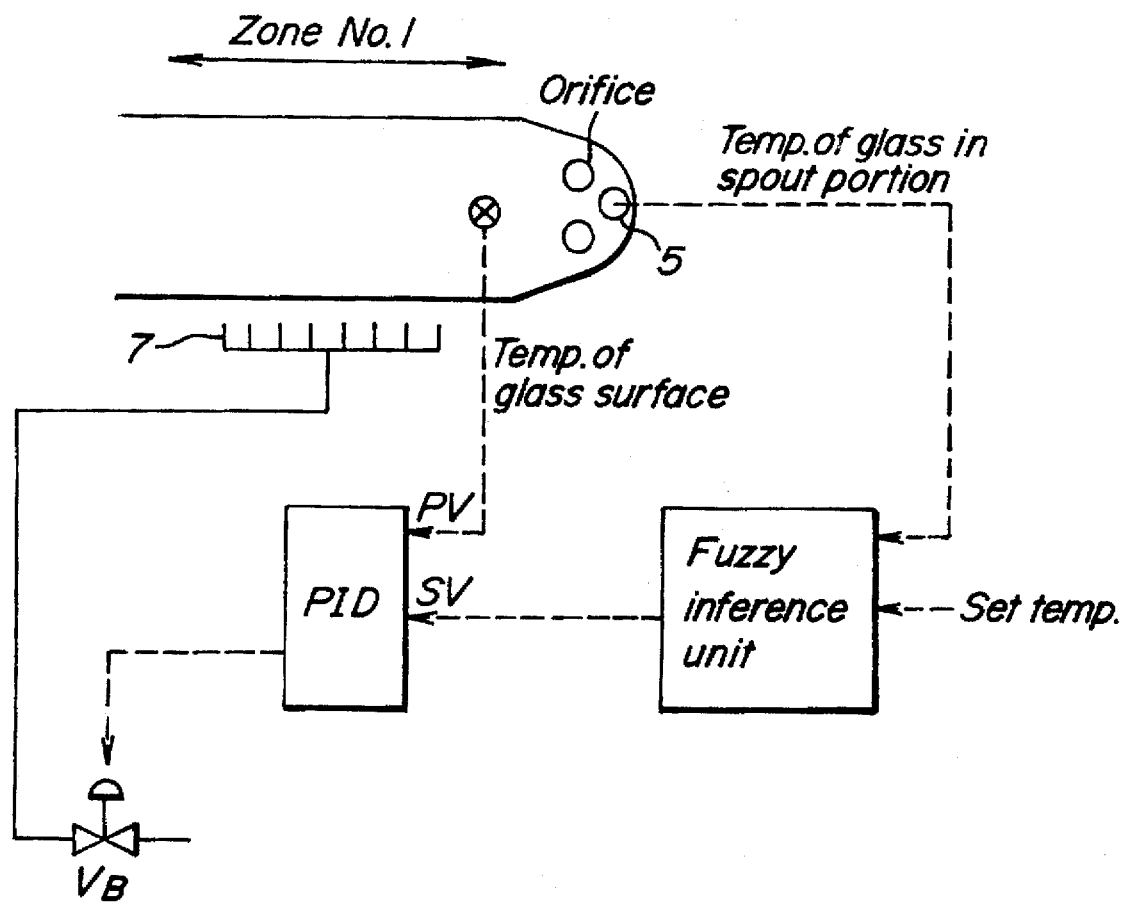
FIG. 7 is a view for schematically illustrating a view for illustrating a process for controlling the temperature of a glass at a spout portion.

That is, as shown in FIG. 7, the temperature of the glass in the spout portion is measured by the trilevel thermocouple 5 denoted by o, and is inputted to the fuzzy inference unit as an input datum. Then, a fuzzy inference result is inputted to the PID controller. On the other hand, the temperature of the glass surface in the zone No.1 is measured by the radiation thermometer 4, and the measured glass surface temperature is inputted to the PID controller to adjust the set point of the PID controller. Thereby, the amount of the combustion gas through the burner unit to the zone No. 1 is controlled.

(1) Inputted data and the membership function

Figure 8:
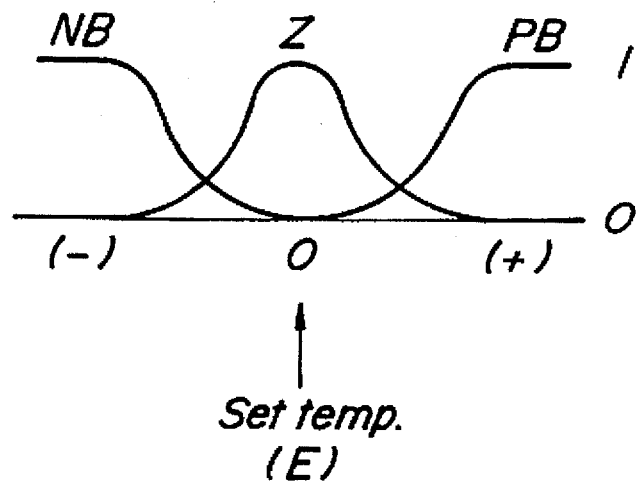
FIGS. 8 and 9 illustrate membership functions.
Figure 9:
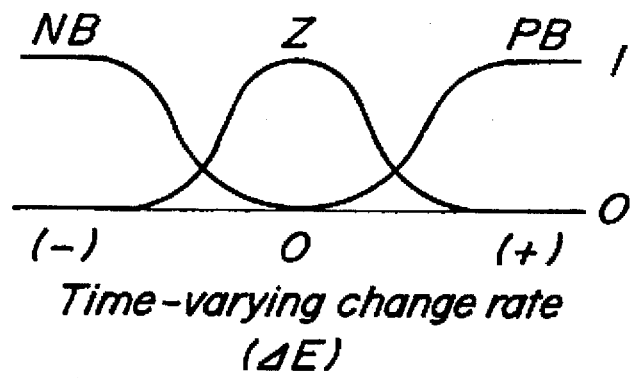

Inputted data and the membership function used for the fuzzy inference are shown in FIGS. 8 and 9.

a) Deviation (E) between measured and set temperatures of the glass in the spout portion (FIG. 8).

b) Time-varying change rate ($\Delta E$) of the temperature of the glass [=(measured temperature at the current time)−(measured temperature at the previous time)] in the spout portion (FIG. 9)

In FIGS. 8 and 9, PB, Z, and NB are meanings given to the membership function as shown below.

PB: Positive big
Z: Zero
NB: Negative big (2) Inference rule (Control rule)(Table 1)

In Table 1 is shown an inference rule by which a set temperature of the glass surface in the zone No. 1 is determined based on the deviation between the measured and set temperatures and the time-varying change rate with respect to the temperature of the glass.

TABLE 1

|   |    | A   |     |     |
|---|----|-----|-----|-----|
|   |    | NB  | Z   | PB  |
| B | PB | NS* | NM* | NB* |
|   | Z  |     | Z*  |     |
|   | NB | PB* | PM* | PS* |

Note: A ... Deviation in temperature of glass, (E)
B ... Time-varying change rate in temperature of glass, ($\Delta E$)

Each blank in Table 1 is a portion not defined which is interdependently determined from the manipulating variables in the adjacent areas and the membership functions (This is the same as in Tables 3, 6, 13, 14, 15, 16 and 17).

According to the inference rule given in Table 1, for example, a case in the upper right portion means that "if the deviation is PB (positive big) and the time-varying change rate is PB (positive big), then the set temperature of the glass surface must be set NB (negative big)".

In Table 1, PB*, PM*, PS*, Z*, NS*, NM* and NB* are meanings given to the membership function for the set temperature of the glass surface in the zone No.1 as an operational unit in a consequence of the inference rule.

PB*: Positive Big
PM*: Positive Medium
PS*: Positive Small
Z*: Zero
NS*: Negative Small
NM*: Negative Medium
NB*: Negative Big A change rate or change amount ($\Delta U$) in a new or renewed set temperature of the glass surface in the zone No. 1 is fuzzy inferred based on two variables, i.e., the deviation (E) and the time-varying change amount ($\Delta E$) of the temperature of he glass in the spout portion.

When the set temperatures of the glass surface in the zone No. 1 are specified by a plurality of inference rules, the change amount ($\Delta U$) of the set temperature of the glass surface in the zone No. 1 is determined by a weighted-means method at values of membership functions thereof.

A new or renewed set temperature of the glass surface in the zone No. 1 is obtained by adding the change amount (ΔU) of the set temperature of the glass in the zone No. 1 in the current time to the temperature of the glass surface in the zone No. 1 at the current time.

(B) Stably controlling the temperature of the glass in the zone Nos. 2 and 3

This is a control loop for stabilizing the temperature of the glass in the zone Nos. 2 and 3 as the cooling zones of the forehearth at a constant temperature so as to stabilize the temperature of the gobs.

Figure 10:
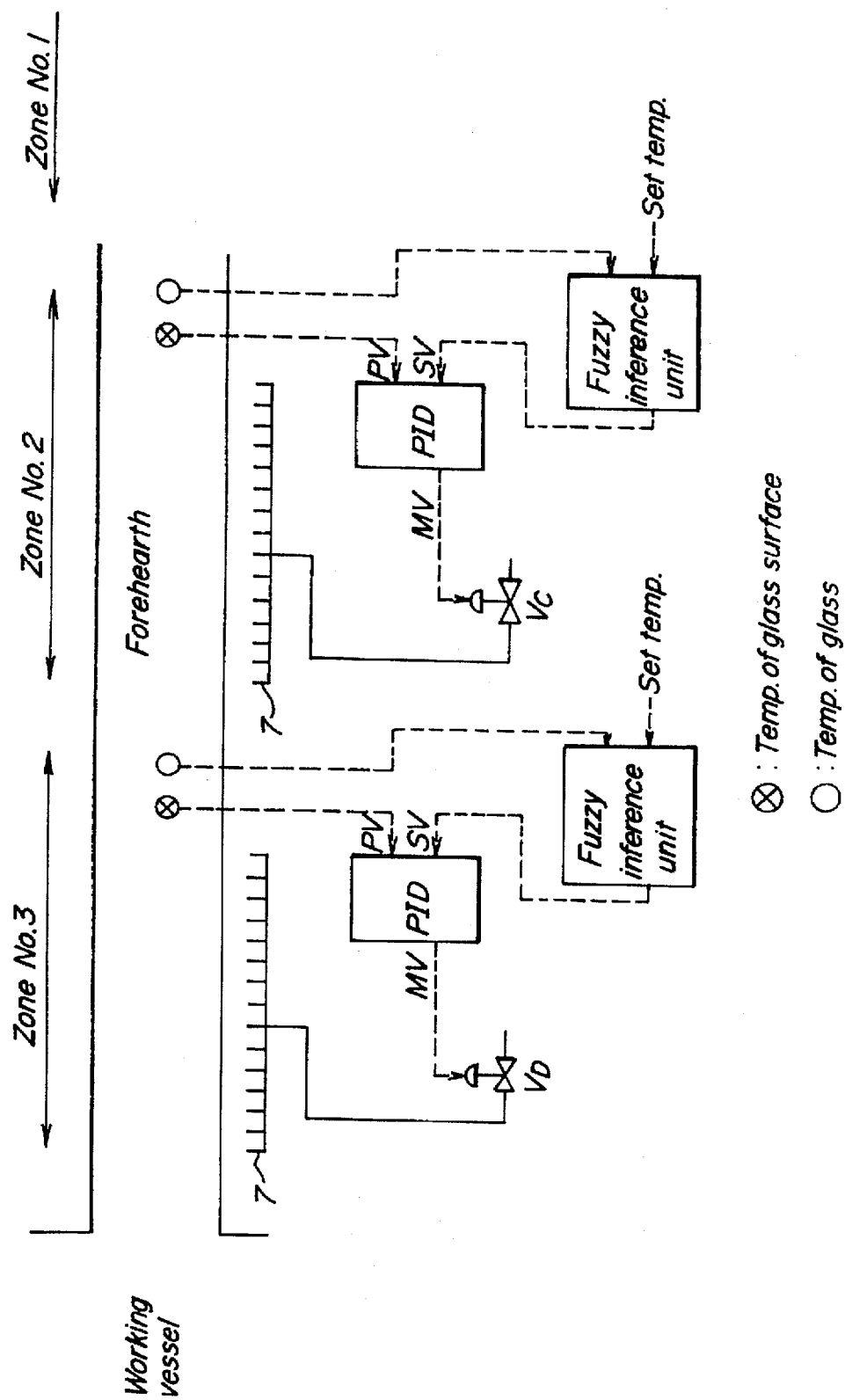
FIG. 10 a view for schematically illustrating a process for stably controlling the temperature of the glass in zone Nos. 2 and 3.

As shown in FIG. 10, the temperature of the glass in each of the zone Nos. 2 and 3 is measured, and a deviation between the measured and set temperatures is determined. On the other hand, the time-varying change amount of the temperature of the glass in each of the zone Nos. 2 and 3 is determined. Based on the deviation and the change amount determined above, a fuzzy inference is effected to determine the temperature of the glass surface in each of the zone Nos. 2 and 3. The thus set temperatures are fed to a one-loop controller (PID controller in FIG. 10) for automatically controlling the temperature of the glass surface in each of the zone Nos. 2 and 3.

(1) Inputted data and membership functions

Inputted data and the membership function used for the fuzzy inference are shown in FIGS. 11–14.

a) Deviation (E) between measured and set temperatures of the glass in the zone No. 2 (FIG. 11).

b) Time-varying change rate (ΔE) of the temperature of the glass [=(temperature measured at the current time)−(measured temperature measured at the previous time)] in the zone No. 2 (FIG. 12)

c) Deviation (E) between measured and set temperatures of the glass in the zone No. 3 (FIG. 13)

d) Time-varying change rate (ΔE) of the temperature of the glass [=(temperature measured at the current time)−(measured temperature measured at the previous time)] in the zone No. 3 (FIG. 14)

(2) Inference rule (Control loop) (Table 2)

a) Zone No. 2

The change amount (ΔU) of the set temperature of the glass surface in the zone No. 2 is fuzzy inferred based on two variables, i.e., the deviation (E) in the temperature of the glass and the time-varying change amount (ΔE) in the zone No. 2 according to an inference rule in Table 2.

According to the inference rule given in Table 2, for example, a case in the upper right portion means that "if the deviation is PB (positive big) and the time-varying change rate is PB (positive big), then the set temperature of the glass surface must be set NB(negative big)".

In Table 2, PB*, PM*, PS*, Z*, NS*, NM* and NB* are the same meanings as given before.

TABLE 2

|   |    | A   |     |     |
|---|----|-----|-----|-----|
|   |    | NB  | Z   | PB  |
| B | PB | Z*  | NM* | NB* |
|   | Z  | PM* | Z*  | NM* |
|   | NB | PB* | PM* | Z*  |

Note: A ... Deviation in temperature of glass, (E)
B ... Time-varying change rate in temperature of glass (ΔE)

b) Zone No. 3

The change amount (ΔU) of the set temperature of the glass surface in the zone No. 3 is fuzzy inferred based on two variables, i.e., the deviation (E) and the time-varying change amount (ΔE) in the temperature of the glass in the zone No. 3.

The inference rule is the same as that in the just above case regarding the zone No. 2.

(C) Control to correct the manipulating variable in the zone Nos. 1 and 2

As shown in FIG. 15, the temperature of the glass in each of the zone Nos. 1, 2 and 3 is stably controlled to a preset level. A manipulating variable in a single loop is observed in each zone, and the change amount (ΔU) of the set temperature of the glass in the prestage zone is fuzzy inferred such that the manipulating amount may fall in an appropriate range. In FIG. 15, "o" denotes an orifice (1) Inputted data and membership functions a) Deviation between the open degree of the zone No. 1 and appropriate open degree thereof (FIG. 16)

b) Time-varying change amount of the temperature of the glass in the zone 1 (FIG. 17)

c) Deviation between the open degree of the burner valve in the zone No. 2 and an appropriate open degree thereof (FIG. 18)

d) Time-varying change amount of the temperature of the glass surface in the zone No. 2 (FIG. 19)

(2) Inference rule (Control loop) (Table 3)

a) Zone No. 1

Fuzzy inference is effected based on the deviation in the open degree of the burner valve in the zone No. 1 and the time-varying change amount of the temperature of the glass surface, thereby determining a change amount (ΔU) of the set temperature of the glass in each of the zone Nos. 2 and 3.

TABLE 3

|   |    | A   |     |     |
|---|----|-----|-----|-----|
|   |    | NB  | Z   | PB  |
| B | PB | NB* |     | Z*  |
|   | Z  | NM* | Z*  | PM* |
|   | NB | Z*  | Z*  | PB* |

Note: A ... Deviation in open degree of burner value in zone No. 1 (E)
B ... Time-varying change rate in temperature of glass surface (ΔE)

b) Zone No. 2

Fuzzy inference is effected based on the deviation in the open degree of the burner valve in the zone No. 2 and the time-varying change rate of the temperature of the glass surface, thereby determining a change amount (ΔU) of the temperature of the set temperature of the glass in each of the zone No. 3.

The inference rule is the same as in the just above case regarding the zone No. 1.

(D) Uniformly controlling the temperature of the glass in the zone No. 1

In order to minimize the difference in the temperature of the glass in the vertical direction, fuzzy function is effected based on a difference in temperature between an upper location and a medium location of the glass in the zone No. 1 or on a difference in temperature between an upper location and a lower location of the glass in the zone No. 1, thereby determining a change amount of the set temperature of the glass in each of the zone Nos. 2 and 3.

Figure 20:
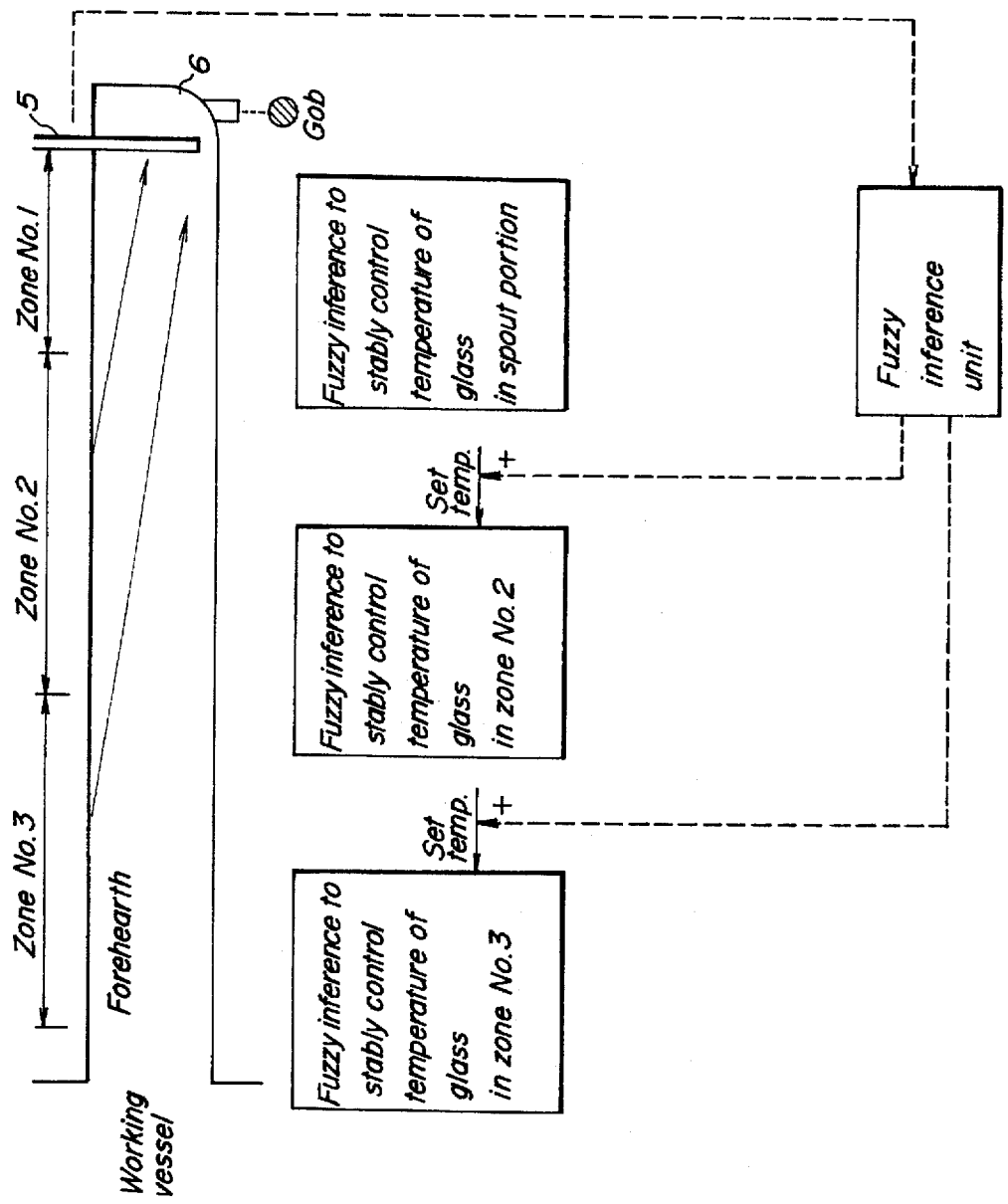
FIG. 20 is a view for schematically illustrating a process for uniformly controlling the temperature of the glass in zone No. 1.

As shown in FIG. 20, the glass inside the forehearth inclinedly flows downwardly toward a lower portion of the spout from a surface layer. Therefore, it is possible that the temperature of the glass at the upper portion of the zone No. 1 is controlled by the burners in the zone No. 1, the temperature of the glass in the intermediate portion of the zone No. 1 is controlled by the burners in the zone No. 2, and the temperature of the glass in the lower portion of the zone No. 1 is controlled by the burners in the zone No. 3 (See FIG. 20).

(1) Inputted data and membership functions (a) Difference in temperature of the glass in the zone No. 1 between the upper portion and the intermediate portion (FIG. 21)

As shown in FIG. 21, an allowable range is provided near around Zero, and the manipulating amount is not changed if the temperature difference falls in this allowable range. Therefore, the maximum allowable temperature difference between the upper portion and the intermediate portion in the zone No. 1 can be controlled by varying the width of the allowable range.

b) Difference in temperature of the glass in zone No. 1 between the upper portion and the lower portion (FIG. 22)

In this case, an allowable range is provided in the membership function for the inputted data, as is the same as the just above case a) regarding the difference in temperature of the glass in the zone No. 1 between the upper portion and the intermediate portion in FIG. 21.

(2) Inference rule (Control rule) (Tables 4 and 5)

Fuzzy inference is effected based on the difference in temperature of the glass in the zone No. 1 between the upper portion and the intermediate portion or on the difference in temperature of the glass in the zone No. 1 between the upper portion and the lower portion, thereby determining a change amount ($\Delta U$) of the set temperature of the glass in each of the zone Nos. 2 and 3.

TABLE 4

| Difference in temperature of glass between upper location and intermedium location | | | | |
| --- | --- | --- | --- | --- |
| NB | NS | Z | PS | PB |
| NB* | NM* | Z | PM* | PB* |

TABLE 5

| Difference in temperature of glass between upper location and lower location | | | | |
| --- | --- | --- | --- | --- |
| NB | NS | Z | PS | PB |
| NB* | NM* | Z* | PM* | PB* |

(E) Controlling external disturbance

In each of the zone Nos. 1, 2 and 3, the temperature of the glass is stably controlled to a preliminarily set level. However, since the controlling time interval is as long as 5 minutes, rapid change in temperature cannot be fully followed. Thus, this is a control loop for coping with external disturbances in which a control time interval is shortened to 1 minute so as to cope with such a rapid change in temperature.

Figure 23:
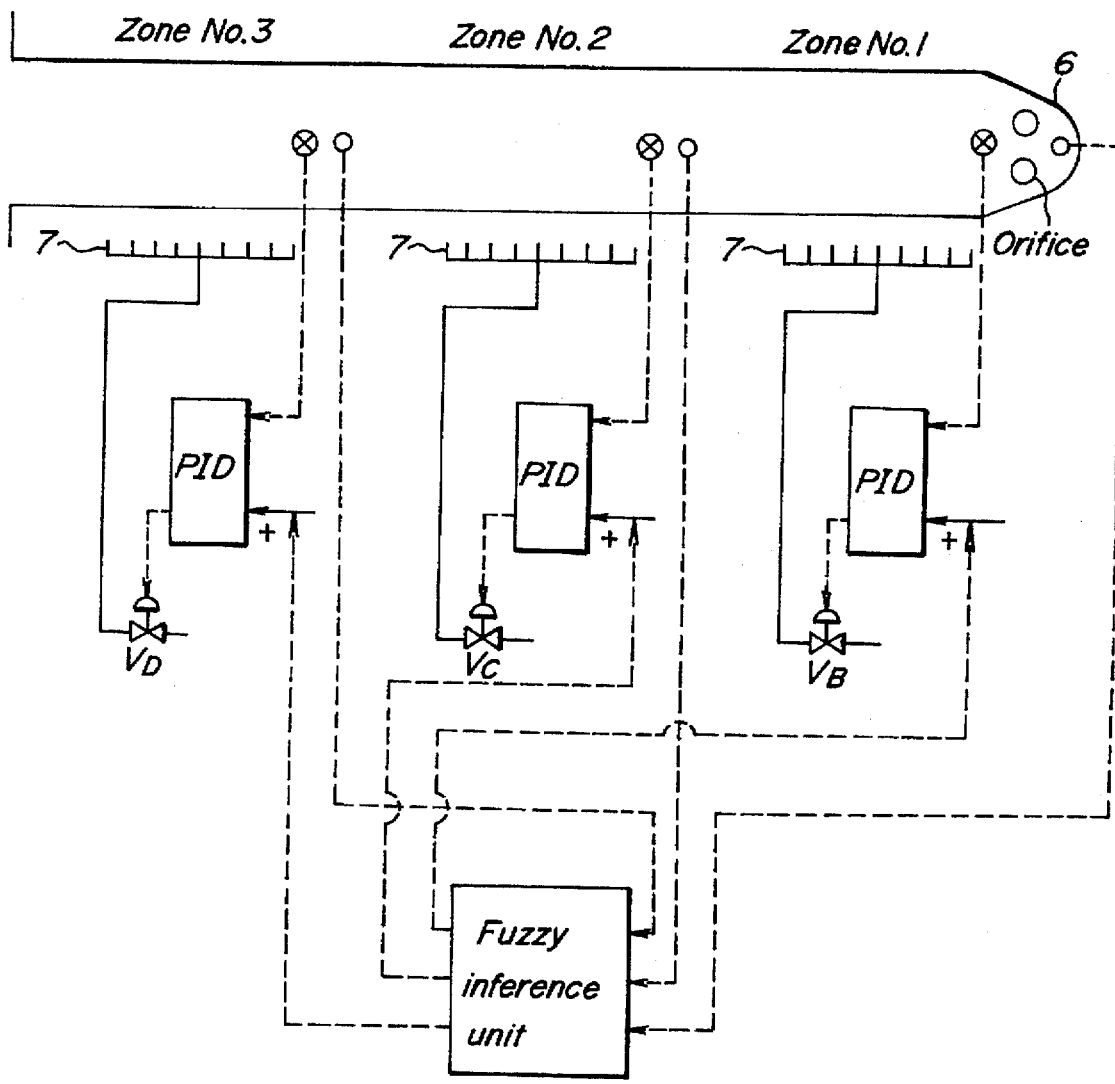
FIG. 23 is a view for schematically illustrating a process for controlling external disturbances.

As shown in FIG. 23, according to this control loop, the time-varying change rate of the temperature of the glass in each of the spout portion, and the zone Nos. 1, 2 and 3 is detected, and if the detected temperature is greater than the preliminarily set temperature, a change amount ($\Delta U$) of the set temperature of the glass surface in the corresponding zone is fuzzy inferred.

Figure 24:
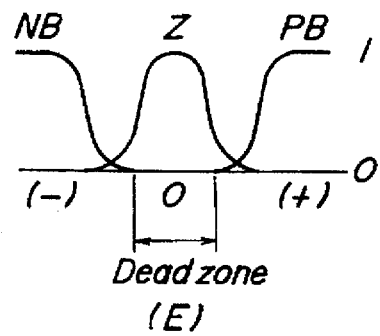

(1) Inputted data and membership functions a) Deviation (E) between measured and set temperatures of the glass in the spout portion (FIG. 24).

Figure 25:
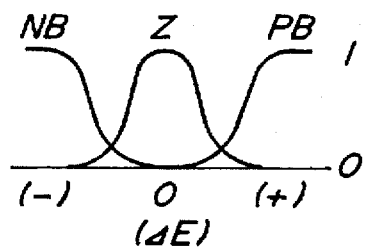
Figure 26:
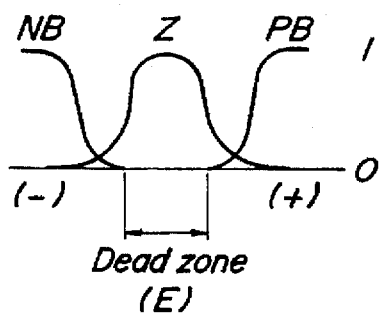

In the dead zone of FIG. 24, the manipulating amount will not be changed.

b) Time-varying change rate ($\Delta E$) of the temperature of the glass [=(temperature measured at the current time)−(measured temperature measured at the previous time)] in the spout portion (FIG. 25)

c) Deviation (E) between measured and set temperatures of the glass in the zone No. 1 (FIG. 26)

Figure 27:
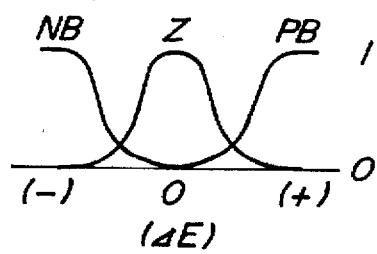

In the dead zone of FIG. 26, the manipulating amount will not be changed.

d) Time-varying change rate ($\Delta E$) of the temperature of the glass [=(temperature measured at the current time)−(measured temperature measured at the previous time)] in the zone No. 1 (FIG. 27)

e) Deviation (E) between measured and set temperatures of the glass in the zone No. 2 (FIG. 28)

In the dead zone of FIG. 28, the manipulating amount will not be changed.

f) Time-varying change rate ($\Delta E$) of the temperature of the glass [=(temperature measured at the current time)−(measured temperature measured at the previous time)] in the zone No. 2 (FIG. 29)

g) Deviation (E) between measured and set temperatures of the glass in the zone No. 3 (FIG. 30)

In the dead zone of FIG. 30, the manipulating amount will not be changed.

h) Time-varying change rate ($\Delta E$) of the temperature of the glass [=(temperature measured at the current time)−(measured temperature measured at the previous time)] in the zone No. 3 (FIG. 31)

(2) Inference rule (Control loop) (Table 6)

Fuzzy inference is effected based on the deviation in the temperature and the time-varying change amount of the glass in each of the spout and the zones, and the change amount ($\Delta U$) of the set temperature of the glass surface therein is determined (With respect to the spout portion and the zone Nos. 1–3, the inference rule shown in the following Table 6 is set)

TABLE 6

| | | A | | |
| --- | --- | --- | --- | --- |
| | | NB | Z | PB |
| B | PB | Z* | | NB* |
| | Z | PS* | Z* | NS* |
| | NB | PB* | | Z* |

Note: A ... Deviation in the temperature of the glass
B ... Time-varying change amount of the glass

[II] Fuzzy control at the time of rise setting

When the kind of the glass to be produced is to be changed, that is, when the kind of the molds is to be changed for this production, the flow rate of the glass is changed corresponding to the kind of the glass to be next produced, and accordingly the temperature of the gob and the target temperature of the glass are changed. At that time, when the temperature of the gob and the temperature of the glass are stabilized to the respective target temperatures in a shorter time, the production yield can be enhanced by decreasing the number of poor articles produced.

According to the controlling process of the present invention, the time of rise setting when the molds are changed can be shorted by the following two ways.

(i) Changing set items for the succeeding production of next products

Figure 32:
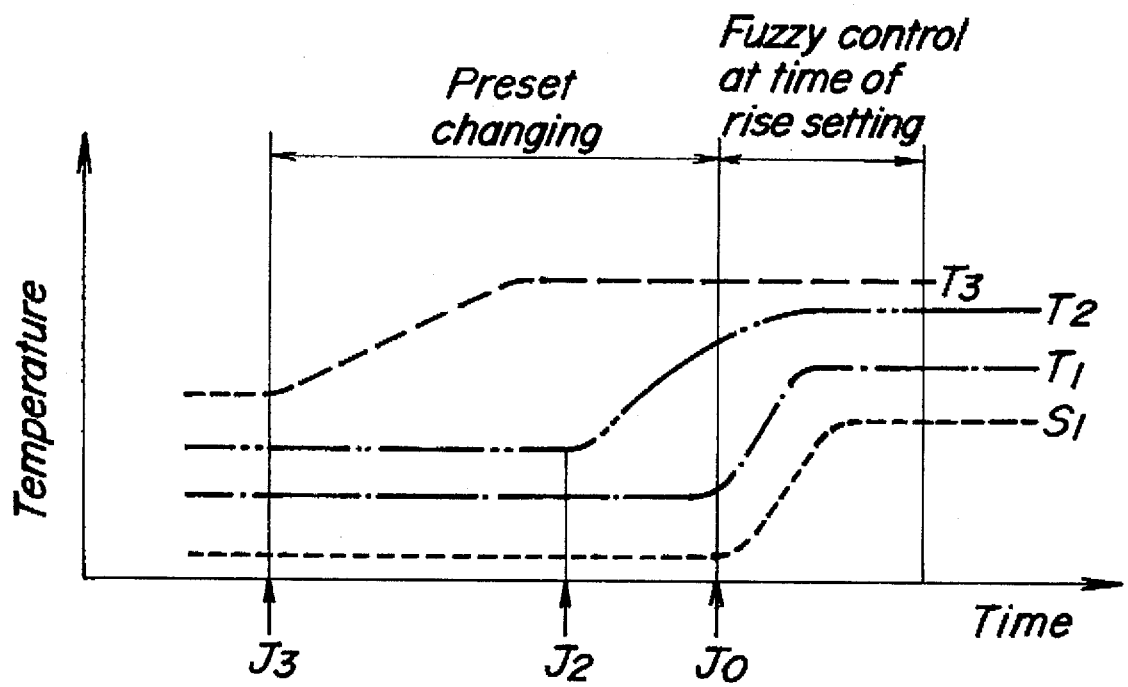
FIG. 32 is a view for schematically illustrating a process for shortening the time to reach stable start-up.

As shown in FIG. 32, before starting changing the kinds of the glass to be produced, while the temperature of the glass in the spout portion is being maintained to the temperature required for the glass being currently produced, the temperature of the glass in the forehearth is successively changed to a temperature required for the production of the glass to be next produced, from a location (zone No. 3) near the melting furnace to a location (zone No.1) near the spout portion. Thereby, controlling can be effected such that changing the temperature in the spout portion to the temperature required for the succeeding production of the changed kind of the glass can be speedily completed after the kinds of the glass are terminated.

That is, the set temperature of the glass in the zone No. 3 is raised at a point of time, J3. Then, the set temperature of the glass in the second zone No. 2 is raised at a point of time, J2, and thereafter the set temperatures of the glass in the zone No. 1 and the spout portion are raised at a point of time, Jo. Simultaneously with the point of time, Jo, the molds are begun to be exchanged.

(ii) Fuzzy controlling at the time of rise setting

As shown in FIG. 32, the period of rise setting after job changing is shortened by changing the temperature of the glass in the forehearth, before job changing, from a side near the melting furnace through changing set items for the succeeding production of next products.

As mentioned later, the controlling process of the present invention is characterized by the fuzzy control at the time of rise setting.

The fuzzy control at the time of the rise setting has the following control loops.

(A) Controlling at the time of changing the temperature of the glass to a target control temperature (B) Controlling to effect earlier stabilization of the temperature of the glass in the spout portion (C) Controlling to effect earlier stabilization of the temperature of the glass in each of the zones 1–3.

Figure 33:
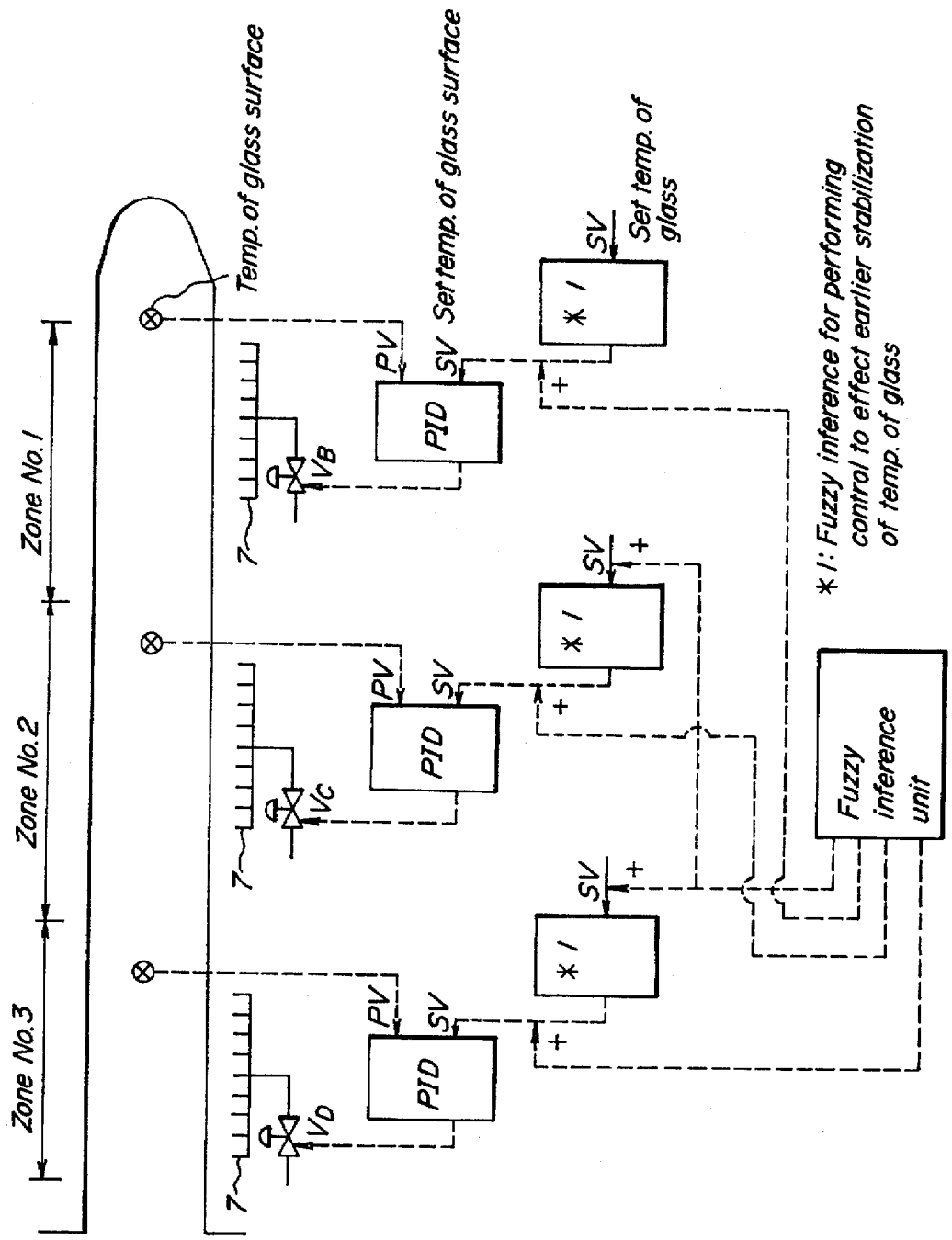
FIG. 33 is a view for schematically illustrating a process for effecting control to alter the target control temperature.

(D) Controlling the cooling valves for the cooling zones (A) Controlling at the time of changing the temperature of the glass to a target control temperature As shown in FIG. 33, when the set (target) temperature of the glass in the zone is changed by an operator or the like, fuzzy inference is effected based on two variables, i.e., the change amount of the set temperature and a deviation between the measured and set temperatures of the glass, thereby determining a change amount ($\Delta U$) of the temperature of the glass surface in zone in concern.

Further, when the set (target) temperature of the glass in the spout portion is changed, a change amount is added to the current set temperature in each of the zones 2 and 3 so as to follow the temperature of the glass to the set temperature at an early stage.

Figure 34:
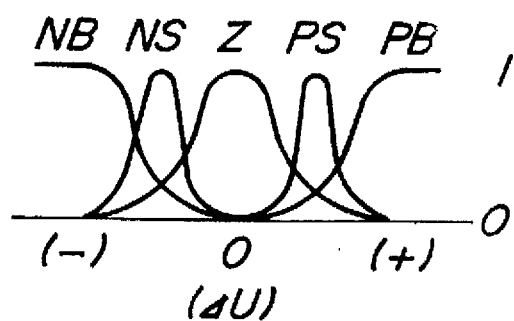
FIGS. 34 and 35 illustrate membership functions.
Figure 35:
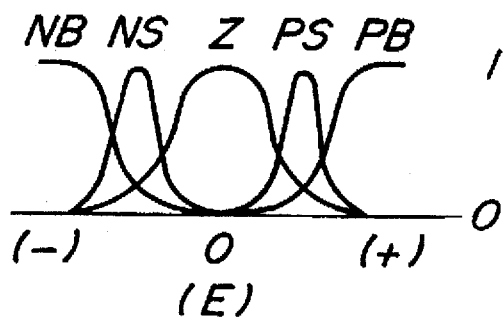

(1) Inputted data and membership functions a) Change amount ($\Delta U$) of the set temperature of the glass [=(newly set temperature)−(temperature set at the previous time)] in the spout portion (FIG. 34)

b) Deviation (E) between measured and set temperatures of the glass in the spout portion (FIG. 35)

c) Time-varying change rate ($\Delta E$) of the temperature of the glass [=(newly set temperature)−(temperature set at the previous time)] in the spout portion A membership function is the same as that in the above case a).

d) Deviation (E) between measured and set temperatures of the glass in the zone No. 3

A membership function is the same as that in the above case b).

e) Change amount ($\Delta U$) of the set temperature of the glass [=(newly set temperature)−(temperature set at the previous time)] in the zone No. 3

A membership function is the same as that in the above case a).

f) Deviation (E) between measured and set temperatures of the glass in the zone No. 3

A membership function is the same as that in the above case b).

(2) Inference rule a) When the set temperature of the glass in the spout portion is changed:

Fuzzy inference is effected based on the change amount of the set temperature of the spout portion, thereby determining a change amount ($\Delta U$) of the set temperature of the glass in each of the zone Nos. 2 and 3.

The magnitude of the deviation (E) between the measured and set temperatures of the glass in the zone 2, 3 is compared with the magnitude of the change amount ($\Delta U$), and fuzzy theory is effected based on a smaller one of these two values. Thereby, the change amount ($\Delta U$) of the set temperature of the glass surface in the zone No. 1 is determined.

a-1) When the change amount of the set temperature of the glass is smaller (Table 7):

TABLE 7

| \multicolumn{5}{c}{Change amount of the set temperature ($\Delta T$) of the glass temperature in the area} | | | | |
|---|---|---|---|---|
| NB | NS | Z | PS | PB |
| NM* | NS* | Z* | PS* | PM* | a-2: When the deviation (E) between the measured and set temperatures of the glass is smaller:

TABLE 8

| Deviation (E) between the measured and set temperatures of the glass | | | | |
|---|---|---|---|---|
| NB | NS | Z | PS | PB |
| PM* | PS* | Z* | NS* | NM* | b) When the set temperature of the zone No. 2 is changed:

The change amount ($\Delta T$) is compared with the deviation (E) between the measured and set temperatures of the glass, and fuzzy inference is effected based on a smaller one of these two values. Thereby, the change amount ($\Delta U$) of the temperature of the glass surface in the zone No.2 is determined.

b-1) When the change amount of the set temperature of the glass is smaller (Table 9):

TABLE 9

| Change amount ($\Delta T$) of the set temperature of the glass | | | | |
|---|---|---|---|---|
| NB | NS | Z | PS | PB |
| NM* | NS* | Z* | PS* | PM* | b-2) When the deviation (E) between the measured and set temperatures of the glass is smaller (Table 10)

TABLE 10

| Deviation (E) between the measured and set temperatures of the glass | | | | |
|---|---|---|---|---|
| NB | NS | Z | PS | PB |
| PM* | PS* | Z* | NS* | NM* | c) When the set temperature of the glass is changed:

The change amount ($\Delta T$) of the set temperature of the glass in the zone No. 3 is compared with the deviation (E) between the measured and set temperatures of the glass, and the fuzzy inference is effected based on a smaller one of these two values. Thereby, a change amount ($\Delta U$) of the set temperature of the glass surface in the zone No. 3 is determined.

c-1) When the change amount of the set temperature of the glass is smaller (Table 11):

TABLE 11

| Change amount (ΔT) of the set temperature of the glass | | | | |
|---|---|---|---|---|
| NB | NS | Z | PS | PB |
| NM* | NS* | Z* | PS* | PM* | c-2) When the deviation between the measured and set temperatures of the glass is smaller (Table 12)

TABLE 12

| Deviation (E) between the measured and set temperatures of the glass | | | | |
|---|---|---|---|---|
| NB | NS | Z | PS | PB |
| NM* | NS* | Z* | PS* | PM* |

(B) Control to effect early stabilization of the temperature of the glass in the spout portion This is a control loop to stop flowing of the glass at the time of changing the jobs, and changing the temperature of the glass and raising the system at an early stage after starting/stopping a feeder mechanism.

Figure 36:
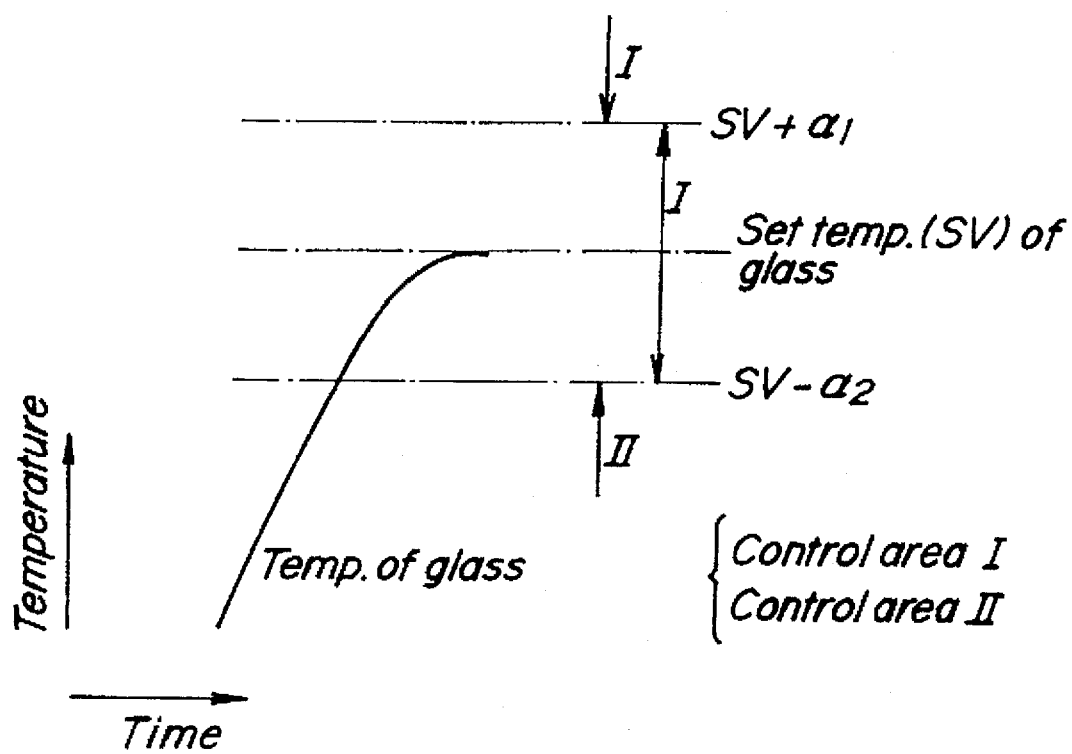
FIGS. 36 and 37 are views for schematically illustrating processes for effecting control to stabilize the temperature of the glass in the spout portion in a shorter time.
Figure 37:
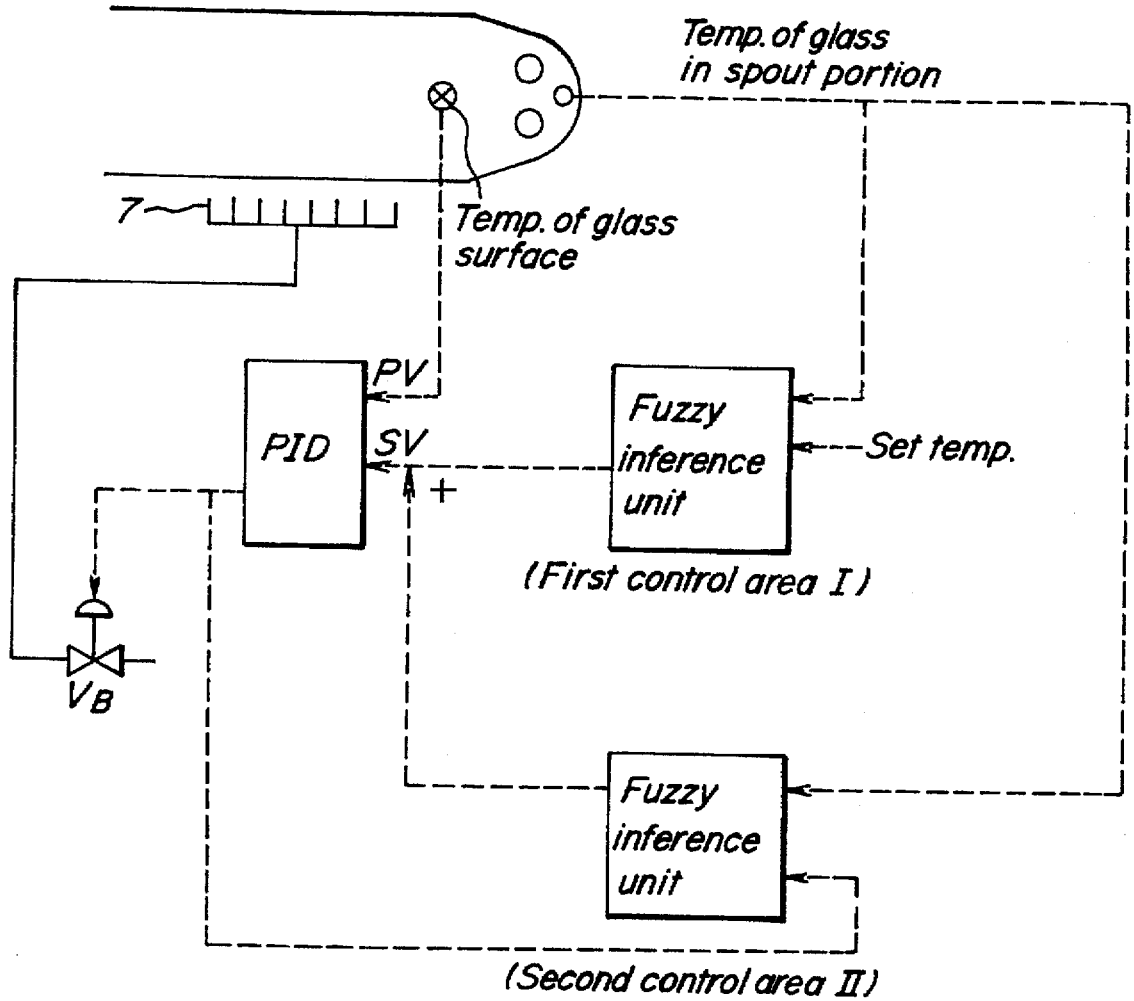

This loop is constituted by a first control area (I) and a second control area (II). In the first control area (I), a fuzzy inference is effected based on the deviation (E) between the measured and set temperatures of the glass in the spout portion and a time-varying change amount between the temperature measured at a current time and that measured at a previous time. In the second control area (II), manipulating amounts are continuously outputted when the measured temperature of the glass is largely away from the set temperature. A control time interval is 5 minutes for the first control area (I) and 30 seconds for the second control area (II) (See FIGS. 36 and 37).

Values $\alpha_1$ and $\alpha_2$ parting the first area (I) and the second area (II) from the set temperature (SV) of the glass can be arbitrarily set. Ordinarily, the values $\alpha_1$ and $\alpha_2$ are set at +5° C. and −5° C. relative to the set temperature SV of the glass, respectively.

(1) Inputted data and membership functions a) First control area (I)

a-1) Deviation (E) between the measured and set temperatures of the glass in the spout portion (FIG. 38)

a-2) Time-varying change amount (ΔE) [=(temperature of the glass measured at a current time)−(temperature of the glass measured at a previous time) of the temperature of the glass] in the spout portion (FIG. 39)

b) Second control area (II)

b-1) Deviation (E) between the measured and set temperatures of the glass in the spout portion (FIG. 40)

b-2) Open degree of burner valve (FIG. 41)

(2) Inference rule a) First Control area (I) (Table 13)

Fuzzy inference is effected based on the deviation and the time-varying change amount in the temperature of the glass in the spout portion, thereby determining a change amount (ΔU) of the set temperature of the glass surface in the zone No. 1.

TABLE 13

| | | A | | | | |
|---|---|---|---|---|---|---|
| | | NB | NS | Z | PS | PB |
| B | PB | NS* | | NM* | | NB* |
| | PS | Z* | | NS* | NM* | |
| | Z | | | Z* | | |
| | NS | | PM* | PS* | | Z* |
| | NB | PB* | | PM* | | PS* |

Note:
A ... Deviation in temperature of glass
B ... Time-varying change amount of the temperature of the glass b) Second control area (II) (Table 14)

Fuzzy inference is effected based on the deviation in the temperature of the glass in the spout portion and the open degree of the burner valve in the zone No. 1, thereby determining the change amount (ΔU) of the set temperature of the glass surface in the zone No. 1.

TABLE 14

| | | A | | |
|---|---|---|---|---|
| | | NB | Z | PB |
| B | PB | | | |
| | Z | PS* | Z* | NS* |
| | NB | | | |

Note: A ... Deviation in the temperature of the glass
B ... Open degree of the burner valve (C) Control to effect early stabilization of the temperature of the glass in each zone This is a control loop to effect control for early stabilizing the temperature of the glass in the spout portion, and for rising the temperature of the glass to the set temperature and realizing the stabilization of the glass in each of the zone Nos. 2 and 3 at an early stage. Each zone has a fuzzy inference rule.

Figure 43:
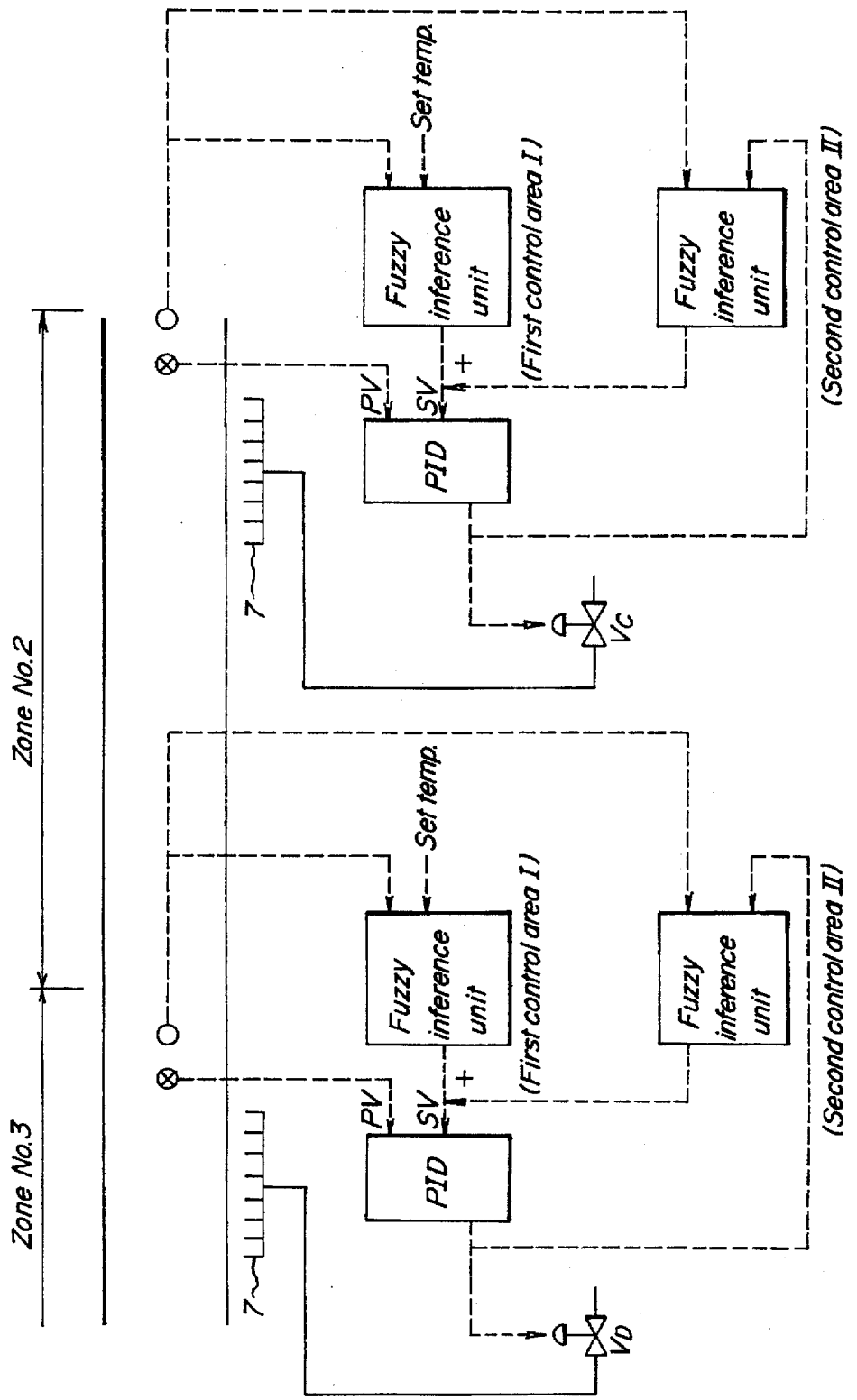

Further, this control loop has a first control area (I) and a second control area (II), too, and a control cycle is 5 minutes for the first area (I), and 30 seconds for the second area (II) (See FIGS. 42 and 43).

Values $\alpha_1$ and $\alpha_2$ parting the first area (I) and the second area (II) from the set temperature (SV) of the glass in FIG. 42 can be arbitrarily set. Ordinarily, the values $\alpha_1$ and $\alpha_2$ are +5° C. and −5° C. relative to the set temperature SV of the glass, respectively.

(1) Inputted data and membership functions

The following inputted data and membership functions are applied to the zone Nos. 2 and 3, too.

a) First control area (I)

a-1) Deviation (E) between the measured and set temperatures of the glass in each trilevel thermocouple in zone No. 2 and 3. (FIG. 44)

a-2) Time-varying change amount (ΔE) [=(temperature of the glass measured at a current time)−(temperature of the glass measured at a previous time) of the temperature of the glass in each trilevel thermocouple in zone No. 2 and 3. (FIG. 45)

b) Second control area (II)

b-1) Deviation (E) between the measured and set temperatures of the glass in each trilevel thermocouple in zone No. 2 and 3. (FIG. 46)

b-2) Open degree of burner valve (FIG. 47)

b-3) Open degree of burner valve for the zone No.3 (FIG. 48)

(2) Inference rule

The zone Nos. 2 and 3 have their inference rule, which is the same as that for the zone No. 1 given below.

a) First Control area (I) (Table 15)

Fuzzy inference is effected based on the deviation and the time-varying change amount in the temperature of the glass, thereby determining change amounts ($\Delta U$) of the set temperature of the glass surface in each of the zone Nos. 2 and 3.

TABLE 15

|   |    |     |     | A   |     |     |
|---|----|-----|-----|-----|-----|-----|
|   |    | NB  | NS  | Z   | PS  | PB  |
| B | PB | Z*  |     | NM* |     | NB* |
|   | PS |     | Z*  | NS* | NM* |     |
|   | Z  | PM* | PS* | Z*  | NS* | NM* |
|   | NS |     | PM* | PS* | Z*  |     |
|   | NB | PB* |     | PM* |     | Z*  |

Note:
A . . . Deviation in temperature of glass
B . . . Time-varying change amount of the temperature of the glass b) Second control area (II) (Table 16)

Fuzzy inference is effected based on the deviation in the temperature of the glass and the open degree of the burner valves $V_C$ and $V_D$ for the zone Nos. 2 and 3, respectively. Thereby, a change amount ($\Delta U$) of the set temperature of the glass surface in each of the zone Nos. 2 and 3 is determined.

TABLE 16

|   |    |     | A   |     |
|---|----|-----|-----|-----|
|   |    | NB  | Z   | PB  |
| B | PB |     |     |     |
|   | Z  | PS* | Z*  | NS* |
|   | NB |     |     |     |

Note: A ... Deviation in the temperature of the glass
B ... Open degree of the glass (D) Controlling cooling valves in the cooling zones As shown in FIG. 3, cooling air is led into the forehearth through air inlets 8 on opposite sides of the forehearth, cools the glass surface in the forehearth, and is mixed with the combustion gas through the burners in a short time and discharged through a ceiling of the forehearth.

Figure 49:
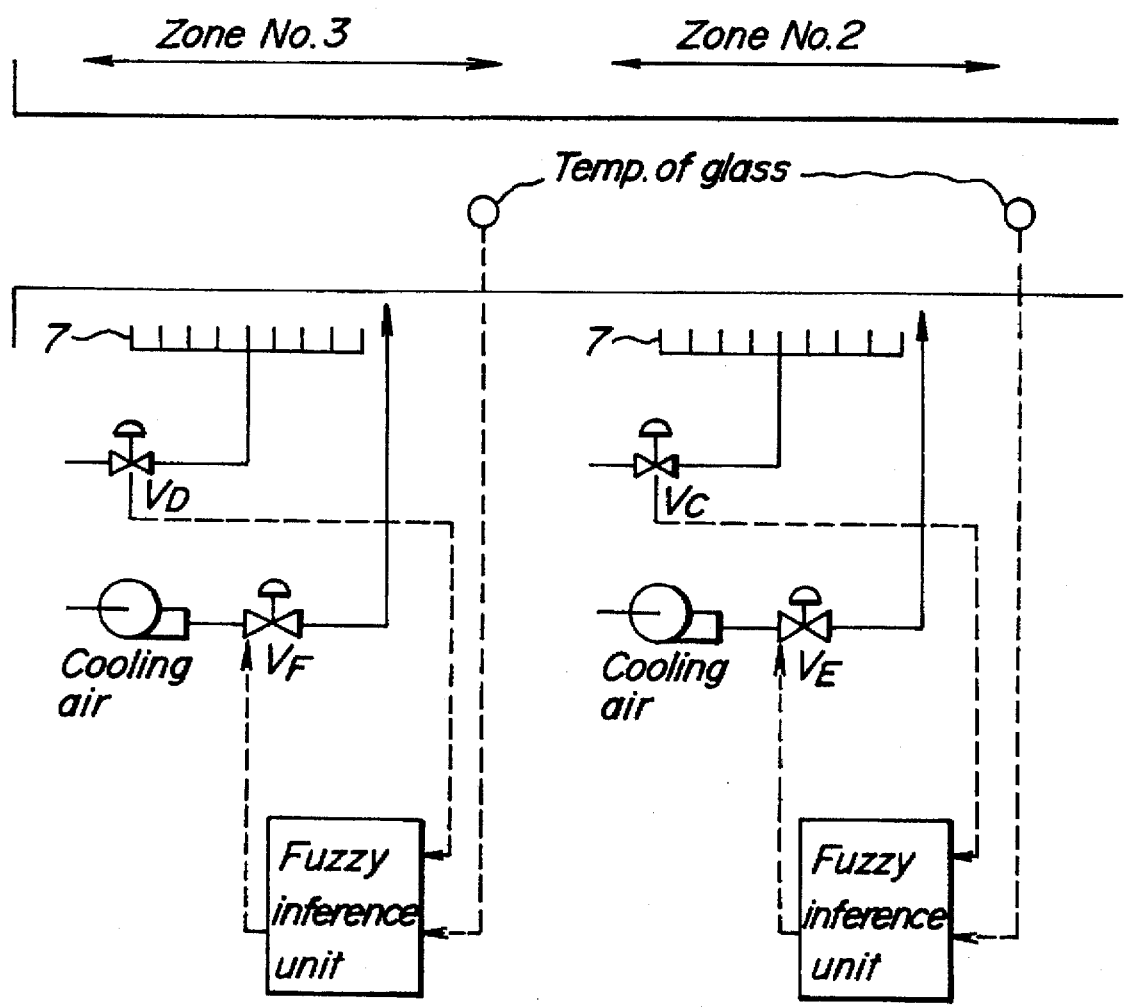
FIG. 49 is a view for schematically illustrating a process for controlling a cooling valve in a cooling section.

In order to early raise the temperature of the glass to a set temperature particularly at the time of the job changing and adjusting the open degree of the burners to an appropriate value, fuzzy inference is effected based on the open degree of the burners and the deviation in the temperature of the glass. Thereby, a change amount ($\Delta U$) of the open degree of the cooling valves is determined (See FIG. 49)

The cooling valve system is also provided for each of the zone Nos. 2 and 3.

(1) inputted data and membership functions

Figure 50:
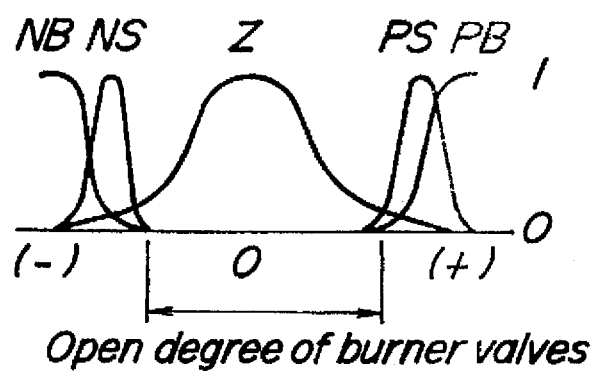
FIGS. 50 and 51 illustrate membership functions.
Figure 51:
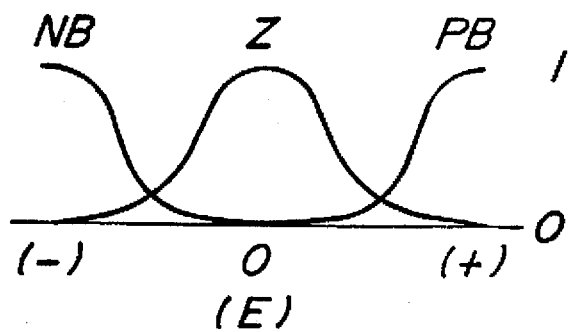

The following inputted data and membership functions are also applicable to each of the zone Nos. 2 and 3.

a) Deviation between the measured open degree and an optimum open degree of the burner valves (FIG. 50)

b) Deviation between the measured and set temperatures of the glass (FIG. 51)

(2) Inference rule

The zone Nos. 2 and 3 have their respective inference rule, which is the same as that for the zone No. 1.

TABLE 17

|   |    |     |     | A  |     |     |
|---|----|-----|-----|----|-----|-----|
|   |    | NB  | NS  | Z  | PS  | PB  |
| B | PB |     |     |    |     |     |
|   | Z  | PB* | PS* | Z* | NS* | NB* |
|   | NB |     |     |    |     |     |

Note:
A . . . Deviation in open degree of the burner valves
B . . . Deviation in temperature of the glass In the controlling system for effecting the process of the present invention, for example, the following conditions are employed.

Cooling blower: 200 mmH$_2$O
Blow air: 1000–1200 mmH$_2$O
LPG: 1300–1500 mmH$_2$O, 10,000 cal.
Shut-off valve: about 500 mmH
(Sectionar area of burner nozzle)/(sectionar area of mixer nozzle): 3.5–5, about 850 cal.
Pressure of mixed gas from burner: Minimum 20 mmH$_2$O The above embodiments employ PID controllers. As a matter of course, it is possible to feed outputs to the manipulators directly through the fuzzy inferences without using the PID controller.

[Experiment 1]

FIGS. 52(a) and 52(b) show measurement results in the production of Article A (soft drink bottle: 200 ml and 170 g) with respect to the temperature at a tank connection, the zone No. 3 trilevel thermocouple temperature (the temperature of the glass), the No. 2 zone trilevel thermocouple temperature (temperature of the glass), and the temperature of the glass in the spout portion. The above temperatures were determined based on temperatures of the glass surface in each of the zones and the spout portion. The above measurements were effected by a conventional controlling with PID controllers or by the invention process (controlling the temperature in the spout portion and controlling for stabilization of the temperature in each zone). The measuring points were the same for the conventional controlling and the invention process.

As is clear from actual measurement results in FIG. 52(a), according to the conventional controlling, the temperatures of the glass were influenced by external disturbances [variations in the temperature of the glass from the glass-melting furnace (working end connection temperature) and variations in temperature of the atmosphere around the forehearth], and large temperature variations occurred with the result that the temperature variations were as much as 10° C. in the spout portion indicating the final forming temperature of the glass. On the other hand, as shown in FIG. 52(b), according to the invention process, even if the working end connection temperature varied by as much as 10° C. at the time for job changing in adjacent production lines, the temperature of the glass in each of the zones and the spout portion could be stably controlled. Consequently, the variations in the temperature of the glass in each of the zones and the spout portion could be made smaller so that the variations in the temperature of the glass in the spout portion could be controlled to not more than 2° C. In this way, the controllability in the steady-state fuzzy control according to the present invention during the production of the glass articles is more excellent than that of the conventional controlling process.

[Experiment 2]

Figure 53A:
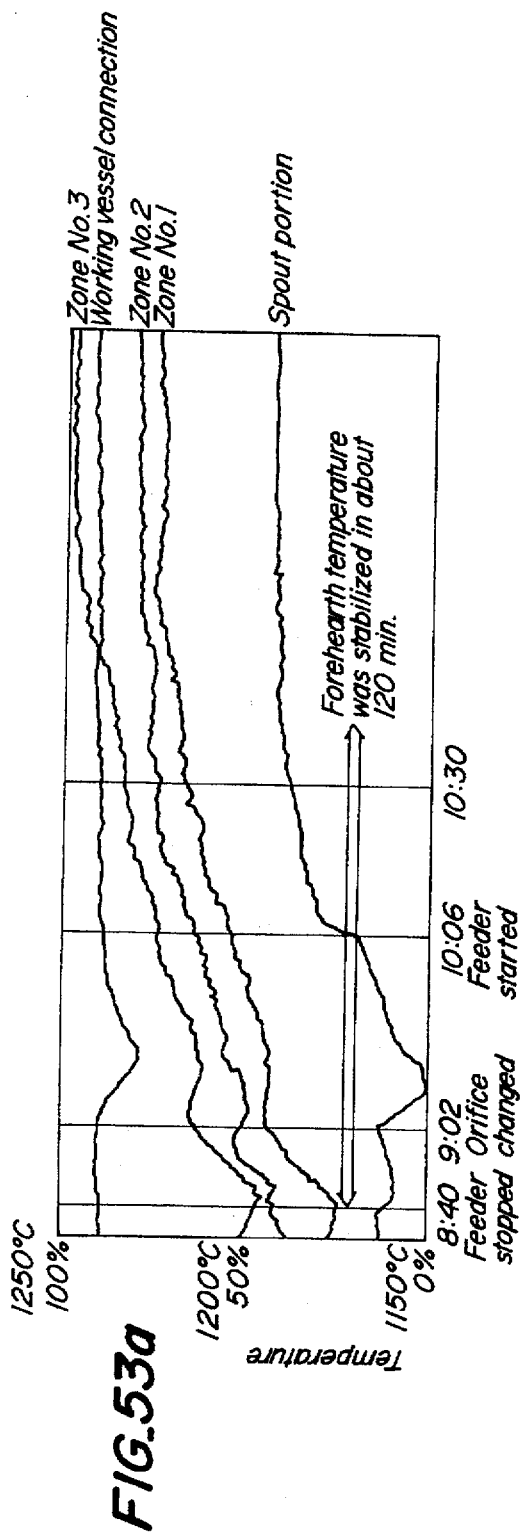
FIG. 53(a) is a view for illustrating control data (conventional control data) for stabilizing the temperature in the spout portion at the time of job changing.
Figure 53B:
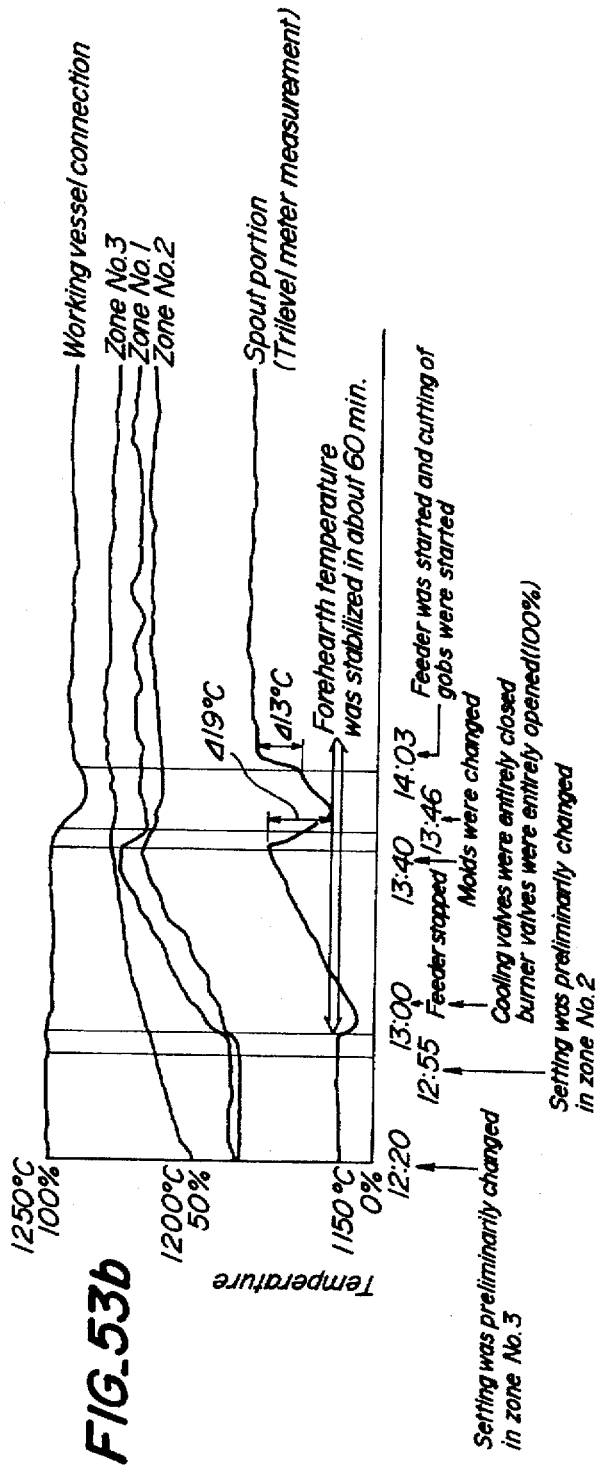
FIG. 53(b) is a view for illustrating control data (invention system control data) for stabilizing the temperature in the spout portion at the time of job changing.

FIGS. 53(a) and 53(b) show measurement results in job change from Article B (juice bottles: 200 ml and 170 g) into Item A (Sake bottle: 500 ml and 380 g) with respect to the temperature at the tank connection, the No. 1–3 zone trilevel thermocouple temperatures (the temperatures of the glass), and the temperature of the glass in the spout portion. The above temperatures were determined based on temperatures of the glass surface in each of the zones and the spout portion. The above measurements were effected by a conventional controlling with PID controllers or by the invention process (controlling the temperature in the spout portion and controlling for stabilization of the temperature in each zone). The measuring points were the same for the conventional controlling and the invention process.

As shown in FIGS. 53(a), in the conventional control process, the feeder mechanism was stopped (job changing started) at 8:40 and the set values of the PID controllers in each of the zone Nos. 1–3 were simultaneously set to the data in the previous production. As a result, it took 120 minutes until the temperature of the forehearth was finally stabilized. On the other hand, as shown in Table. 18, according to the present process, the temperatures fit to the glass articles in the succeeding production were preliminarily inputted to the controlling system.

Table. 18 illustrates an example in which is shown systematically a current control mode, set values for the kind of glass articles currently produced, measurement values for the glass articles currently produced, the flow-out rate of the glass for the article currently produced, set values of next article, a point of time to start next job changing, a point of time for preliminary setting in the zone No. 3, and a point of time for preliminary setting in the zone No. 2.

Data in Tables 18.1–18.5 are displayed together in a single display view, although Tables 18.1–18.5 are separately shown below.

TABLE 18.1

| Forehearth temperature control setting | | | |
|---|---|---|---|
| control mode | steady state | job changing | steady state |
| | | setting was preliminarily changed / start-up stabilizing | |

TABLE 18.2

| Set temperature | | | | |
|---|---|---|---|---|
| | trilevel | | | |
| | 1 | 2 | 3 | 4 |
| Zone No. 1 | 1190° C. | 1228° C. | 1187° C. | 1198° C. |
| Zone No. 2 | 1189° C. | 1230° C. | 1179° C. | 1213° C. |
| Zone No. 3 | 1195° C. | 1240° C. | 1178° C. | 1220° C. |

Spout portion temperature (1, 3) 1161° C.

Measurement temperature (2, 4) 1189° C.

Table 18.3

| Alteration of set values |
|---|
| flow-out rate of current gobs 70 T/D<br>job changing time 13:00<br>No. 2 SU changing started at 12:55<br>No. 3 SU changing started at 12:30 |

| spout portion/CWC temp. printed | |
|---|---|
| cancelled | feeder started |

TABLE 18.4

| Fuzzy loop | | | | |
|---|---|---|---|---|
| 1 | 2 | 3 | 4 | 5 |
| 6 | 7 | 8 | 9 | 10 |

| Control switch | |
|---|---|
| Zone No. 1 | REMOTE |
| Zone No. 2 | REMOTE |
| Zone No. 3 | REMOTE |

TABLE 18.5

| | Measurement temperature | | | | | | |
|---|---|---|---|---|---|---|---|
| | tank connection | zone No.3 | zone No.2 | right portion in zone No.1 | center portion in zone No.1 | left portion in zone No.1 | spout portion |
| trilevel thermocouple H | 1210.7 | 1195.8 | 1189.8 | 1179.1 | 1190.2 | 1178.9 | |
| trilevel thermocouple M | 1209.4 | 1195.2 | 1188.9 | 1169.4 | 1189.9 | 1171.9 | 1160.1 |
| trilevel thermocouple L | 1205.2 | 1194.7 | 1189.1 | 1164.9 | 1191.6 | 1167.3 | |
| radiation temp. | | 1178.1 | 1179.5 | | 1185.7 | | |
| open degree of burner valve | | 45.3 | 30.2 | | 48.8 | | |

TABLE 18.5-continued

| | Measurement temperature | | | | | | |
|---|---|---|---|---|---|---|---|
| | tank connection | zone No.3 | zone No.2 | right portion in zone No.1 | center portion in zone No.1 | left portion in zone No.1 | spout portion |
| open degree of cooling valve (damper) | | 10.0 | 10.0 | | | | |

According to the process of the present invention, as shown in Table 18, changing the set item in the zone No. 3 was started 30 minutes before the job was changed to the next one (12:30), and the alteration of set values in the zone No. 2 was started about 5 minutes (12:55) before the job changing (12:55). As shown in FIG. 53(b), it is seen from actually measured results that the zone No. 3 reached the temperature fit to the succeeding production earlier by effecting the alteration of set values.

In the zone Nos. 1 and 2, in order to raise the temperature by the fuzzy control earlier than in the conventional control, the feeder was stopped (the job changing was started) at 13:00, and simultaneously the cooling valve was entirely closed and the burner valve was entirely opened (100%). Thereby, the temperature was raised earlier as compared with the conventional control. As a result, the temperature of the forehearth was stabilized in 60 minutes.

As is seen from the above, the controllability with the fuzzy control in the present invention at the time of controlling the start-up stabilization after the job changing is more excellent than in the conventional control.

FIGS. 54 and 55 graphically show how much the productivity of the Article A (juice bottles: 200 ml and 170 g) was improved by the more excellent controllability of the invention process as compared with the conventional control process. Since the time required for job changing was shortened, the production line in job changing could be raised earlier, and the production efficiency was enhanced on the first day. Further, in the steady state in the second day and thereafter, while the productivity of the Articles A in the conventional process was particularly worse due to unstable temperature of the glass as compared with that of other articles, according to the invention control process, the productivity was improved by the stabilization of the temperature of the glass. In the concrete example, since the average production lot was 3 days, the entire productivity including the job changing could be improved by 15% according to the invention control process. Furthermore, excellent results were obtained with respect to the controllability and productivity in the invention control process as compared with the conventional control process with respect to the same kind of articles.

In the case of a production line in which the production lot is short and the job changing is frequent, the temperature of glass is conventionally likely to be extremely unstable due to combined poor conditions. On the other hand, according to the present invention, the conventional problems in the temperature of the forehearth during the job changing and steady-state running can be solved, thereby largely contributing to improvement of the productivity.

Various needs such as reduction in weight and high quality occur for the glass articles, and there is a strong tendency that numerous kinds of glass bottles are produced in smaller lots (more frequent job changing is required), and many factors causing cost rise occur.

As mentioned above, according to the present invention, the time required for job changing for different glass articles to be produced becomes shorter, and the variation in the temperature of gobs (in the spout portion) can be reduced. Accordingly, the time required to obtain good quality lots after the molds are changed for intended glass articles to be produced can be largely shortened. Further, since the gob weight can be stabilized, a working for adjusting the gob weight can be reduced. In addition, the production rate of defective product can be reduced by stabilizing the temperature of the gobs. Thus, the control process of the present invention largely contributes to the stabilization of the production process and improvement of the yield.

What is claimed is:

1. A process for controlling the temperature of glass inside a forehearth for the formation of gobs by feeding, to a feeder, a glass melted in a glass-melting furnace through a working end adjacent the glass-melting furnace and the forehearth provided with combustion means, said process including the steps of:

(a) dividing the forehearth into at least three zone Nos. 1, 2 and 3, said zone No. 1 being a conditioning zone, and said zone Nos. 2 and 3 being cooling zones;

(b) forming a spout portion at a tip of said zone No. 1;

(c) providing cooling means at opposite sides of each of said zone Nos. 2 and 3;

(d) measuring the temperature of a glass material in the spout portion with a trilevel thermocouple arranged in said spout portion;

(e) measuring the temperature of the glass surface in a downstream portion of each zone with a glass surface thermometer arranged therein;

(f) measuring the temperature of the glass with a plurality of trilevel thermocouples arranged in each zone;

(g) determining a new or renewed set temperature to be set of the glass surface in the zone No. 1 by effecting a fuzzy inference based on a preset membership function and a preset inference rule of a fuzzy set by using two variables:

i) a deviation amount between the open degree of the burners of zone No. 1 and an appropriate open degree thereof; and ii) a time-varying change amount between the currently measured temperature and the previously measured temperature of the glass surface in zone No. 1;

(h) determining a new or renewed set temperature to be set of the glass surface in each of zone Nos. 2 and 3 through a fuzzy inference based on a preset membership function and an inference rule of a preset fuzzy set by using two variables:

i) a deviation amount between the open degree of the burners in zone No. 2 and an appropriate open degree thereof; and ii) a time-varying change amount between the currently measured temperature and the previously measured temperature of the glass surface in the zone No. 2, and a change amount of the temperature of the glass in zone No. 3; and (i) controlling the temperature of the glass in each of the zone Nos. 1, 2 and 3 to the respective new set temperatures determined in steps (g) and (h).

2. The process of claim 1, wherein inside the zone No. 1 is arranged a trilevel thermocouple for measuring temperatures of the glass flowing in upper, intermediate and lower positions, respectively; the temperatures of the glass are measured at these positions, a fuzzy inference is effected based on a difference in the temperature of the glass between the upper position and the intermediate position and on a difference in the temperature of the glass between the upper position and the lower position, and a change amount of the set temperature of the glass in each of the zone Nos. 2 and 3 is controlled.

3. The process as set forth in claim 1, wherein a fuzzy inference is effected based on a deviation between a measured temperature and a set temperatures and a time-varying change amount between the currently measured temperature and the previously measured temperature with respect to the temperature of the glass in each of the spout portion and the zone Nos. 1–3, and a change amount in the set temperature of the glass surface in each of the zones is controlled accordingly.

4. The process as set forth in claim 2, wherein a fuzzy inference is effected based on a deviation between a measured temperature and a set temperatures and a time-varying change amount between the currently measured temperature and the previously measured temperature with respect to the temperature of the glass in each of the spout portion and the zone Nos. 1–3, and a change amount in the set temperature of the glass surface in each of the zones is controlled accordingly.

5. The process as set forth in claim 1, wherein fuzzy inference is effected based on change amounts in the set temperature of the glass in each of the spout portion and the zone Nos. 2 and 3, a deviation amount between the measured temperature of the glass and the set temperature of the glass in each of the spout portion and the zone Nos. 1–3, and ① when the set temperature of the spout portion is changed, the change amounts of the set temperatures of the glass in the zone Nos. 2 and 3 are controlled, and the change amount of the set temperature of the glass surface in the zone No. 1 is controlled, whereas ② when the set temperature of the zone No. 2 is changed, the change amount of the set temperature of the glass surface in the zone No. 2 is controlled, and ③ when the set temperature in the zone No. 3 is changed, the change amount of the set temperature of the glass surface in the zone No. 3 is controlled.

6. The process as set forth in claim 2, wherein fuzzy inference is effected based on change amounts in the set temperature of the glass in each of the spout portion and the zone Nos. 2 and 3, a deviation amount between the measured temperature of the glass and the set temperature of the glass in each of the spout portion and the zone Nos. 1–3, and ① when the set temperature of the spout portion is changed, the change amounts of the set temperatures of the glass in the zone Nos. 2 and 3 are controlled, and the change amount of the set temperature of the glass surface in the zone No. 1 is controlled, whereas ② when the set temperature of the zone No. 2 is changed, the change amount of the set temperature of the glass surface in the zone No. 2 is controlled, and ③ when the set temperature in the zone No. 3 is changed, the change amount of the set temperature of the glass surface in the zone No. 3 is controlled.

7. The process as set forth in claim 3, wherein fuzzy inference is effected based on change amounts in the set temperature of the glass in each of the spout portion and the zone Nos. 2 and 3, a deviation amount between the measured temperature of the glass and the set temperature of the glass in each of the spout portion and the zone Nos. 1–3, and ① when the set temperature of the spout portion is changed, the change amounts of the set temperatures of the glass in the zone Nos. 2 and 3 are controlled, and the change amount of the set temperature of the glass surface in the zone No. 1 is controlled, whereas ② when the set temperature of the zone No. 2 is changed, the change amount of the set temperature of the glass surface in the zone No. 2 is controlled, and ③ when the set temperature in the zone No. 3 is changed, the change amount of the set temperature of the glass surface in the zone No. 3 is controlled.

8. The process as set forth in claim 4, wherein fuzzy inference is effected based on change amounts in the set temperature of the glass in each of the spout portion and the zone Nos. 2 and 3, a deviation amount between the measured temperature of the glass and the set temperature of the glass in each of the spout portion and the zone Nos. 1–3, and ① when the set temperature of the spout portion is changed, the change amounts of the set temperatures of the glass in the zone Nos. 2 and 3 are controlled, and the change amount of the set temperature of the glass surface in the zone No. 1 is controlled, whereas ② when the set temperature of the zone No. 2 is changed, the change amount of the set temperature of the glass surface in the zone No. 2 is controlled, and ③ when the set temperature in the zone No. 3 is changed, the change amount of the set temperature of the glass surface in the zone No. 3 is controlled.

9. The process as set forth in claim 1, wherein a first control area (I) and a second control area (II) are provided; in the first control area (I), a fuzzy inference is effected based on a deviation between the measured temperature and the set temperature and the time-varying change amount between the currently measured temperature of the glass and the previously measured temperature of the glass with respect to the glass in the spout portion; in the second control area (II), variations in temperatures and open degrees of burner and cooling valves are continuously outputted to a Proportional-Integral-Derivative controller when the temperature of the glass in the spout portion differs from the set temperature; in the first control area (I), the temperature of the glass in the spout portion is subjected to a fuzzy inference based on a deviation between the measured temperature and the set temperature and a time-varying change amount of a difference between the currently measured temperature and the previously measured temperature with respect to the glass in the spout portion; in the second control area (II), the temperature of the glass in the spout portion is subjected to a fuzzy inference based on the deviation between the measured temperature and the set temperature of the glass in the spout portion and the open degree of burner valves in the zone No. 1; and a change amount of the set temperature of the glass surface in the zone No. 1 is controlled based on the results of the fuzzy inference.

10. The process as set forth in claim 2, wherein a first control area (I) and a second control area (II) are provided; in the first control area (I), a fuzzy inference is effected based on a deviation between the measured temperature and the set temperature and the time-varying change amount between the currently measured temperature of the glass and the previously measured temperature of the glass with respect to the glass in the spout portion; in the second control area (II), variations in temperatures and open degrees of burner and cooling valves are continuously outputted to a Proportional- Integral-Derivative controller when the temperature of the glass in the spout portion differs from the set temperature; in the first control area (I), the temperature of the glass in the spout portion is subjected to a fuzzy inference based on a deviation between the measured temperature and the set temperature and a time-varying change amount of a difference between the currently measured temperature and the previously measured temperature with respect to the glass in the spout portion; in the second control area (II), the temperature of the glass in the spout portion is subjected to a fuzzy inference based on the deviation between the measured temperature and the set temperature of the glass in the spout portion and the open degree of burner valves in the zone No. 1; and a change amount of the set temperature of the glass surface in the zone No. 1 is controlled based on the results of the fuzzy inference.

11. The process as set forth in claim 3, wherein a first control area (I) and a second control area (II) are provided; in the first control area (I), a fuzzy inference is effected based on a deviation between the measured temperature and the set temperature and the time-varying change amount between the currently measured temperature of the glass and the previously measured temperature of the glass with respect to the glass in the spout portion; in the second control area (II), variations in temperatures and open degrees of burner and cooling valves are continuously outputted to a Proportional-Integral-Derivative controller when the temperature of the glass in the spout portion differs from the set temperature; in the first control area (I), the temperature of the glass in the spout portion is subjected to a fuzzy inference based on a deviation between the measured temperature and the set temperature and a time-varying change amount of a difference between the currently measured temperature and the previously measured temperature with respect to the glass in the spout portion; in the second control area (II), the temperature of the glass in the spout portion is subjected to a fuzzy inference based on the deviation between the measured temperature and the set temperature of the glass in the spout portion and the open degree of burner valves in the zone No. 1; and a change amount of the set temperature of the glass surface in the zone No. 1 is controlled based on the results of the fuzzy inference.

12. The process as set forth in claim 4, wherein a first control area (I) and a second control area (II) are provided; in the first control area (I), a fuzzy inference is effected based on a deviation between the measured temperature and the set temperature and the time-varying change amount between the currently measured temperature of the glass and the previously measured temperature of the glass with respect to the glass in the spout portion; in the second control area (II), variations in temperatures and open degrees of burner and cooling valves are continuously outputted to a Proportional-Integral-Derivative controller when the temperature of the glass in the spout portion differs from the set temperature; in the first control area (I), the temperature of the glass in the spout portion is subjected to a fuzzy inference based on a deviation between the measured temperature and the set temperature and a time-varying change amount of a difference between the currently measured temperature and the previously measured temperature with respect to the glass in the spout portion; in the second control area (II), the temperature of the glass in the spout portion is subjected to a fuzzy inference based on the deviation between the measured temperature and the set temperature of the glass in the spout portion and the open degree of burner valves in the zone No. 1; and a change amount of the set temperature of the glass surface in the zone No. 1 is controlled based on the results of the fuzzy inference.

13. The process as set forth in claim 5, wherein a first control area (I) and a second control area (II) are provided; in the first control area (I), a fuzzy inference is effected based on a deviation between the measured temperature and the set temperature and the time-varying change amount between the currently measured temperature of the glass and the previously measured temperature of the glass with respect to the glass in the spout portion; in the second control area (II), variations in temperatures and open degrees of burner and cooling valves are continuously outputted to a Proportional-Integral-Derivative controller when the temperature of the glass in the spout portion differs from the set temperature; in the first control area (I), the temperature of the glass in the spout portion is subjected to a fuzzy inference based on a deviation between the measured temperature and the set temperature and a time-varying change amount of a difference between the currently measured temperature and the previously measured temperature with respect to the glass in the spout portion; in the second control area (II), the temperature of the glass in the spout portion is subjected to a fuzzy inference based on the deviation between the measured temperature and the set temperature of the glass in the spout portion and the open degree of burner valves in the zone No. 1; and a change amount of the set temperature of the glass surface in the zone No. 1 is controlled based on the results of the fuzzy inference.

14. The process as set forth in claim 6, wherein a first control area (I) and a second control area (II) are provided; in the first control area (I), a fuzzy inference is effected based on a deviation between the measured temperature and the set temperature and the time-varying change amount between the currently measured temperature of the glass and the previously measured temperature of the glass with respect to the glass in the spout portion; in the second control area (II), variations in temperatures and open degrees of burner and cooling valves are continuously outputted to a Proportional-Integral-Derivative controller when the temperature of the glass in the spout portion differs from the set temperature; in the first control area (I), the temperature of the glass in the spout portion is subjected to a fuzzy inference based on a deviation between the measured temperature and the set temperature and a time-varying change amount of a difference between the currently measured temperature and the previously measured temperature with respect to the glass in the spout portion; in the second control area (II), the temperature of the glass in the spout portion is subjected to a fuzzy inference based on the deviation between the measured temperature and the set temperature of the glass in the spout portion and the open degree of the burner valves in the zone No. 1; and a change amount of the set temperature of the glass surface in the zone No. 1 is controlled based on the results of the fuzzy inference.

15. The process as set forth in claim 7, wherein a first control area (I) and a second control area (II) are provided; in the first control area (I), a fuzzy inference is effected based on a deviation between the measured temperature and the set temperature and the time-varying change amount between the currently measured temperature of the glass and the previously measured temperature of the glass with respect to the glass in the spout portion; in the second control area (II), variations in temperatures and open degrees of burner and cooling valves are continuously outputted to a Proportional-Integral-Derivative controller when the temperature of the glass in the spout portion differs from the set temperature; in the first control area (I), the temperature of the glass in the spout portion is subjected to a fuzzy inference based on a deviation between the measured temperature and the set temperature and a time-varying change amount of a difference between the currently measured temperature and the previously measured temperature with respect to the glass in the spout portion; in the second control area (II), the temperature of the glass in the spout portion is subjected to a fuzzy inference based on the deviation between the measured temperature and the set temperature of the glass in the spout portion and the open degree of burner valves in the zone No. 1; and a change amount of the set temperature of the glass surface in the zone No. 1 is controlled based on the results of the fuzzy inference.

16. The process as set forth in claim 8, wherein a first control area (I) and a second control area (II) are provided; in the first control area (I), a fuzzy inference is effected based on a deviation between the measured temperature and the set temperature and the time-varying change amount between the currently measured temperature of the glass and the previously measured temperature of the glass with respect to the glass in the spout portion; in the second control area (II), variations in temperatures and open degrees of burner and cooling valves are continuously outputted to a Proportional-Integral-Derivative controller when the temperature of the glass in the spout portion differs from the set temperature; in the first control area (I), the temperature of the glass in the spout portion is subjected to a fuzzy inference based on a deviation between the measured temperature and the set temperature and a time-varying change amount of a difference between the currently measured temperature and the previously measured temperature with respect to the glass in the spout portion; in the second control area (II), the temperature of the glass in the spout portion is subjected to a fuzzy inference based on the deviation between the measured temperature and the set temperature of the glass in the spout portion and the open degree of burner valves in the zone No. 1; and a change amount of the set temperature of the glass surface in the zone No. 1 is controlled based on the results of the fuzzy inference.

17. The process as set forth in claim 1, wherein a first control area (I) and a second control area (II) are provided; in the first control area (I), the temperatures of the glass in the zone Nos. 2 and 3 are subjected to a fuzzy inference based on a deviation between the measured temperature and the set temperature of the glass in each of the zone Nos. 2 and 3, and the time-varying change amount between the currently measured temperature and the previously measured temperature of the glass in each of the zone Nos. 2 and 3; in the second control area (II), variations in temperatures and open degrees of burner and cooling valves area continuously outputted to the Proportional-Integral-Derivative controller when the temperature of the glass in each of the zone Nos. 1 to 3 differs from the set temperature thereof; in the first control area (I), the temperature of the glass in each of the zone Nos. 2 and 3 is subjected to a fuzzy inference based on a deviation between the measured temperature and the set temperature and a time-varying change amount of a difference between the currently measured temperature and the previously measured temperature with respect to the glass in the spout portion; in the second control area (II), the temperature of the glass in each of the zone Nos. 2 and 3 is subjected to a fuzzy inference based on a deviation between the measured temperature and the set temperature of the glass and the open degree of the burner valves in each of the zone Nos. 2 and 3; in the first control area (I), a change amount of the set temperature of the glass surface in each of the zone Nos. 2 and 3 is controlled; in the second control area (II), a change amount of the set temperature of the glass surface in each of the zone Nos. 2 and 3 is controlled.

18. The process as set forth in claim 2, wherein a first control area (I) and a second control area (II) are provided; in the first control area (I), the temperatures of the glass in the zone Nos. 2 and 3 are subjected to a fuzzy inference based on a deviation between the measured temperature and the set temperature of the glass in each of the zone Nos. 2 and 3, and the time-varying change amount between the currently measured temperature and the previously measured temperature of the glass in each of the zone Nos. 2 and 3; in the second control area (II), variations in temperatures and open degrees of burner and cooling valves are continuously outputted to the Proportional-Integral-Derivative controller when the temperature of the glass in each of zone Nos. 1 to 3 differs from the set temperature thereof; in the first control area (I), the temperature of the glass in each of the zone Nos. 2 and 3 is subjected to a fuzzy inference based on a deviation between the measured temperature and the set temperature and a time-varying change amount of a difference between the currently measured temperature and the previously measured temperature with respect to the glass in the spout portion; in the second control area (II), the temperature of the glass in each of the zone Nos. 2 and 3 is subjected to a fuzzy inference based on a deviation between the measured temperature and the set temperature of the glass and the open degree of the burner valves in each of the zone Nos. 2 and 3; in the first control area (I), a change amount of the set temperature of the glass surface in each of the zone Nos. 2 and 3 is controlled; in the second control area (II), a change amount of the set temperature of the glass surface in each of the zone Nos. 2 and 3 is controlled.

19. The process as set forth in claim 3, wherein a first control area (I) and a second control area (II) are provided; in the first control area (I), the temperatures of the glass in the zone Nos. 2 and 3 are subjected to a fuzzy inference based on a deviation between the measured temperature and the set temperature of the glass in each of the zone Nos. 2 and 3, and the time-varying change amount between the currently measured temperature and the previously measured temperature of the glass in each of the zone Nos. 2 and 3; in the second control area (II), variations in temperatures and open degrees of burner and cooling valves are continuously outputted to the Proportional-Integral-Derivative controller when the temperature of the glass in each of zone Nos. 1 to 3 differs from the set temperature thereof; in the first control area (I), the temperature of the glass in each of the zone Nos. 2 and 3 is subjected to a fuzzy inference based on a deviation between the measured temperature and the set temperature and a time-varying change amount of a difference between the currently measured temperature and the previously measured temperature with respect to the glass in the spout portion; in the second control area (II), the temperature of the glass in each of the zone Nos. 2 and 3 is subjected to a fuzzy inference based on a deviation between the measured temperature and the set temperature of the glass and the open degree of the burner valves in each of the zone Nos. 2 and 3; in the first control area (I), a change amount of the set temperature of the glass surface in each of the zone Nos. 2 and 3 is controlled; in the second control area (II), a change amount of the set temperature of the glass surface in each of the zone Nos. 2 and 3 is controlled.

20. The process as set forth in claim 4, wherein a first control area (I) and a second control area (II) are provided; in the first control area (I), the temperatures of the glass in the zone Nos. 2 and 3 are subjected to a fuzzy inference based on a deviation between the measured temperature and the set temperature of the glass in each of the zone Nos. 2 and 3, and the time-varying change amount between the currently measured temperature and the previously measured temperature of the glass in each of the zone Nos. 2 and 3; in the second control area (II), variations in temperatures and open degrees of burner and cooling valves are continuously outputted to the Proportional-Integral-Derivative controller when the temperature of the glass in each of zone Nos. 1 to 3 differs from the set temperature thereof; in the first control area (I), the temperature of the glass in each of the zone Nos. 2 and 3 is subjected to a fuzzy inference based on a deviation between the measured temperature and the set temperature and a time-varying change amount of a difference between the currently measured temperature and the previously measured temperature with respect to the glass in the spout portion; in the second control area (II), the temperature of the glass in each of the zone Nos. 2 and 3 is subjected to a fuzzy inference based on a deviation between the measured temperature and the set temperature of the glass and the open degree of the burner valves in each of the zone Nos. 2 and 3; in the first control area (I), a change amount of the set temperature of the glass surface in each of the zone Nos. 2 and 3 is controlled; in the second control area (II), a change amount of the set temperature of the glass surface in each of the zone Nos. 2 and 3 is controlled.

21. The process as set forth in claim 5, wherein a first control area (I) and a second control area (II) are provided; in the first control area (I), the temperatures of the glass in the zone Nos. 2 and 3 are subjected to a fuzzy inference based on a deviation between the measured temperature and the set temperature of the glass in each of the zone Nos. 2 and 3, and the time-varying change amount between the currently measured temperature and the previously measured temperature and the previously measured temperature of the glass in each of the zone Nos. 2 and 3; in the second control area (II), variations in temperatures and open degrees of burner and cooling valves are continuously outputted to the Proportional-Integral-Derivative controller when the temperature of the glass in each of zone Nos. 1 to 3 differs from the set temperature thereof; in the first control area (I), the temperature of the glass in each of the zone Nos. 2 and 3 is subjected to a fuzzy inference based on a deviation between the measured temperature and the set temperature and a time-varying change amount of a difference between the currently measured temperature and the previously measured temperature with respect to the glass in the spout portion; in the second control area (II), the temperature of the glass in each of the zone Nos. 2 and 3 is subjected to a fuzzy inference based on a deviation between the measured temperature and the set temperature of the glass and the open degree of the burner valves in each of the zone Nos. 2 and 3; in the first control area (I), a change amount of the set temperature of the glass surface in each of the zone Nos. 2 and 3 is controlled; in the second control area (II), a change amount of the set temperature of the glass surface in each of the zone Nos. 2 and 3 is controlled.

22. The process as set forth in claim 6, wherein a first control area (I) and a second control area (II) are provided; in the first control area (I), the temperatures of the glass in the zone Nos. 2 and 3 are subjected to a fuzzy inference based on a deviation between the measured temperature and the set temperature of the glass in each of the zone Nos. 2 and 3, and the time-varying change amount between the currently measured temperature and the previously measured temperature of the glass in each of the zone Nos. 2 and 3; in the second control area (II), variations in temperatures and open degrees of burner and cooling valves are continuously outputted to the Proportional-Integral-Derivative controller when the temperature of the glass in each of zone Nos. 1 to 3 differs from the temperature thereof; in the first control area (I), the temperature of the glass in each of the zone Nos. 2 and 3 is subjected to a fuzzy inference based on a deviation between the measured temperature and the set temperature and the time-varying change amount of a difference between the currently measured temperature and the previously measured temperature with respect to the glass in the spout portion; in the second control area (II), the temperature of the glass in each of the zone Nos. 2 and 3 is subjected to a fuzzy inference based on a deviation between the measured temperature and the set temperature of the glass and the open degree of the burner valves in each of the zone Nos. 2 and 3; in the first control area (I), a change amount of the set temperature of the glass surface in each of the zone Nos. 2 an 3 is controlled; in the second control area (II), a change amount of the set temperature of the glass surface in each of the zone Nos. 2 and 3 is controlled.

23. The process as set forth in claim 7, wherein a first control area (I) and a second control area (II) are provided; in the first control area (I), the temperatures of the glass in the zone Nos. 2 and 3 are subjected to a fuzzy inference based on a deviation between the measured temperature and the set temperature of the glass in each of the zone Nos. 2 and 3, and the time-varying change amount between the currently measured temperature and the previously measured temperature of the glass in each of the zone Nos. 2 and 3; in the second control area (II), variations in temperatures and open degrees of burner and cooling valves are continuously outputted to the Proportional-Integral-Derivative controller when the temperature of the glass in each of zone Nos. 1 to 3 differs from the set temperature thereof; in the first control area (I), the temperature of the glass in each of the zone Nos. 2 and 3 is subjected to a fuzzy inference based on a deviation between the measured temperature and the set temperature and a time-varying change amount of a difference between the currently measured temperature and the previously measured temperature with respect to the glass in the spout portion; in the second control area (II), the temperature of the glass in each of the zone Nos. 2 and 3 is subjected to a fuzzy inference based on a deviation between the measured temperature and the set temperature of the glass and the open degree of the burner valves in each of the zone Nos. 2 and 3; in the first control area (I), a change amount of the set temperature of the glass surface in each of the zone Nos. 2 and 3 is controlled; in the second control area (II), a change amount of the set temperature of the glass surface in each of the zone Nos. 2 and 3 is controlled.

24. The process as set forth in claim 8, wherein a first control area (I) and a second control area (II) are provided; in the first control area (I), the temperatures of the glass in the zone Nos. 2 and 3 are subjected to a fuzzy inference based on a deviation between the measured temperature and the set temperature of the glass in each of the zone Nos. 2 and 3, and the time-varying change amount between the currently measured temperature and the previously measured temperature of the glass in each of the zone Nos. 2 and 3; in the second control area (II), variations in temperatures and open degrees of burner and cooling valves are continuously outputted to the Proportional-Integral-Derivative controller when the temperature of the glass in each of zone Nos. 1 to 3 differs from the set temperature thereof; in the first control area (I), the temperature of the glass in each of the zone Nos. 2 and 3 is subjected to a fuzzy inference based on a deviation between the measured temperature and the set temperature and a time-varying change amount of a difference between the currently measured temperature and the previously measured temperature with respect to the glass in the spout portion; in the second control area (II), the temperature of the glass in each of the zone Nos. 2 and 3 is subjected to a fuzzy inference based on a deviation between the measured temperature and the set temperature of the glass and the open degree of the burner valves in each of the zone Nos. 2 and 3; in the first control area (I), a change amount of the set temperature of the glass surface in each of the zone Nos. 2 and 3 is controlled; in the second control area (II), a change amount of the set temperature of the glass surface in each of the zone Nos. 2 and 3 is controlled.

25. The process as set forth in claim 9, wherein a first control area (I) and a second control area (II) are provided; in the first control area (I), the temperatures of the glass in the zone Nos. 2 and 3 are subjected to a fuzzy inference based on a deviation between the measured temperature and the set temperature of the glass in each of the zone Nos. 2 and 3, and the time-varying change amount between the currently measured temperature dn the previously measured temperature of the glass in each of the zone Nos. 2 and 3; in the second control area (II), variations in temperatures and open degrees of burner and cooling valves are continuously outputted to the Proportional-Integral-Derivative controller when the temperature of the glass in each of zone Nos. 1 to 3 differs from the set temperature thereof; in the first control area (I), the temperature of the glass in each of the zone Nos. 2 and 3 is subjected to a fuzzy inference based on a deviation between the measured temperature and the set temperature and a time-varying change amount of a difference between the currently measured temperature and the previously measured temperature with respect to the glass in the spout portion; in the second control area (II), the temperature of the glass in each of the zone Nos. 2 and 3 is subjected to a fuzzy inference based on a deviation between the measured temperature and the set temperature of the glass and the open degree of the burner valves in each of the zone Nos. 2 and 3; in the first control area (I), a change amount of the set temperature of the glass surface in each of the zone Nos. 2 and 3 is controlled; in the second control area (II), a change amount of the set temperature of the glass surface in each of the zone Nos. 2 and 3 is controlled.

26. The process as set forth in claim 10, wherein a first control area (I) and a second control area (II) are provided; in the first control area (I), the temperatures of the glass in the zone Nos. 2 and 3 are subjected to a fuzzy inference based on a deviation between the measured temperature and the set temperature of the glass in each of the zone Nos. 2 and 3, and the time-varying change amount between the currently measured temperature and the previously measured temperature of the glass in each of the zone Nos. 2 and 3; in the second control area (II), variations in temperatures and open degrees of burner and cooling valves are continuously outputted to the Proportional-Integral-Derivative controller when the temperature of the glass in each of zone Nos. 1 to 3 differs from the set temperature thereof; in the first control area (I), the temperature of the glass in each of the zone Nos. 2 and 3 is subjected to a fuzzy inference based on a deviation between the measured temperature and the set temperature and a time-varying charge amount of a difference between the currently measured temperature and the previously measured temperature with respect to the glass in the spout portion; in the second control area (II), the temperature of the glass in each of the zone Nos. 2 and 3 is subjected to a fuzzy inference based on a deviation between the measured temperature and the set temperature of the glass and the open degree of the burner valves in each of the zone Nos. 2 and 3; in the first control area (I), a change amount of the set temperature of the glass surface in each of the zone Nos. 2 and 3 is controlled; in the second control area (II), a change amount of the set temperature of the glass surface in each of the zone Nos. 2 and 3 is controlled.

27. The process as set forth in claim 11, wherein a first control area (I) and a second control area (II) are provided; in the first control area (I), the temperatures of the glass in the zone Nos. 2 and 3 are subjected to a fuzzy inference based on a deviation between the measured temperature and the set temperature of the glass in each of the zone Nos. 2 and 3, and the time-varying change amount between the currently measured temperature and the previously measured temperature of the glass in each of the zone Nos. 2 and 3; in the second control area (II), variations in temperatures and open degrees of burner and cooling valves are continuously outputted to the Proportional-Integral-Derivative controller when the temperature of the glass in each of zone Nos. 1 to 3 differs from the set temperature thereof; in the first control area (I), the temperature of the glass in each of the zone Nos. 2 and 3 is subjected to a fuzzy inference based on a deviation between the measured temperature and the set temperature and a time-varying change amount of a difference between the currently measured temperature and the previously measured temperature with respect to the glass in the spout portion; in the second control area (II), the temperature of the glass in each of the zone Nos. 2 and 3 is subjected to a fuzzy inference based on a deviation between the measured temperature and the set temperature of the glass and the open degree of the burner valves in each of the zone Nos. 2 and 3; in the first control area (I), a change amount of the set temperature of the glass surface in each of the zone Nos. 2 and 3 is controlled; in the second control area (II), a change amount of the set temperature of the glass surface in each of the zone Nos. 2 and 3 is controlled.

28. The process as set forth in claim 12, wherein a first control area (I) and a second control area (II) are provided; in the first control area (I), the temperatures of the glass in the zone Nos. 2 and 3 are subjected to a fuzzy inference based on a deviation between the measured temperature and the set temperature of the glass in each of the zone Nos. 2 and 3, and the time-varying change amount between the currently measured temperature and the previously measured temperature of the glass in each of the zone Nos. 2 and 3; in the second control area (II), variations in temperatures and open degrees of burner and cooling valves are continuously outputted to the Proportional-Integral-Derivatives controller when the controller when the temperature of the glass in each of zone Nos. 1 to 3 differs from the set temperature thereof; in the first control area (I), the temperature of the glass in each of the zone Nos. 2 and 3 is subjected to a fuzzy inference based on a deviation between the measured temperature and the set temperature and a time-varying change amount of a difference between the currently measured temperature and the previously measured temperature with respect to the glass in the spout portion; in the second control area (II), the temperature of the glass in each of the zone Nos. 2 and 3 is subjected to a fuzzy inference based on a deviation between the measured temperature and the set temperature of the glass and the opened degree of the burner valves in each of the zone Nos. 2 and 3; in the first control area (I), a change amount of the set temperature of the glass surface in each of the zone Nos. 2 and 3 is controlled; in the second control area (II), a change amount of the set temperature of the glass surface in each of the zone Nos. 2 and 3 is controlled.

29. The process as set forth in claim 13, wherein a first control area (I) and a second control area (II) are provided; in the first control area (I), the temperatures of the glass in the zone Nos. 2 and 3 are subjected to a fuzzy inference based on a deviation between the measured temperature and the set temperature of the glass in each of the zone Nos. 2 and 3, and the time-varying change amount between the currently measured temperature and the previously measured temperature of the glass in each of the zone Nos. 2 and 3; in the second control area (II), variations in temperatures and open degrees of burner and cooling valves are continuously outputted to the Proportional-Integral-Derivatives controller when the temperature of the glass in each of zone Nos. 1 to 3 differs from the set temperature thereof; in the first control area (I), the temperature of the glass in each of the zone Nos. 2 and 3 is subjected to a fuzzy inference based on a deviation between the measured temperature and the set temperature and a time-varying change amount of a difference between the currently measured temperature and the previously measured temperature with respect to the glass in the spout portion; in the second control area (II), the temperature of the glass in each of the zone Nos. 2 and 3 is subjected to a fuzzy inference based on a deviation between the measured temperature and the set temperature of the glass and the open degree of the burner valves in each of the zone Nos. 2 and 3; in the first control area (I), a change amount of the set temperature of the glass surface in each of the zone Nos. 2 and 3 is controlled; in the second control area (II), a change amount of the set temperature of the glass surface in each of the zone Nos. 2 and 3 is controlled.

30. The process as set forth in claim 14, wherein a first control area (I) and a second control area (II) are provided; in the first control area (I), the temperatures of the glass in the zone Nos. 2 and 3 are subjected to a fuzzy inference based on a deviation between the measured temperature and the set temperature of the glass in each of the zone Nos. 2 and 3, and the time-varying change amount between the currently measured temperature and the previously measured temperature of the glass in each of the zone Nos. 2 and 3; in the second control area (II), variations in temperatures and open degrees of burner and cooling valves are continuously outputted to the Proportional-Integral-Derivatives controller when the temperature of the glass in each of zone Nos. 1 to 3 differs from the set temperature thereof; in the first control area (I), the temperature of the glass in each of the zone Nos. 2 and 3 is subjected to a fuzzy inference based on a deviation between the measured temperature and the set temperature and time-varying change amount of a difference between the currently measured temperature and the previously measured temperature with respect to the glass in the spout portion; in the second control area (II), the temperature of the glass in each of the zone Nos. 2 and 3 is subjected to a fuzzy inference based on a deviation between the measured temperature and the set temperature of the glass and the open degree of the burner valves in each of the zone Nos. 2 and 3; in the first control area (I), a change amount of the set temperature of the glass surface in each of the zone Nos. 2 and 3 is controlled; in the second control area (II), a change amount of the set temperature of the glass surface in each of the zone Nos. 2 and 3 is controlled.

31. The process as set forth in claim 15, wherein a first control area (I) and a second control area (II) are provided; in the first control area (I), the temperatures of the glass in the zone Nos. 2 and 3 are subjected to a fuzzy inference based on a deviation between the measured temperature and the set temperature of the glass in each of the zone Nos. 2 and 3, and the time-varying change amount between the currently measured temperature and the previously measured temperature of the glass in each of the zone Nos. 2 and 3; in the second control area (II), variations in temperatures and open degrees of burner and cooling valves are continuously outputted to the Proportional-Integral-Derivative controller when the temperature of the glass in each of zone Nos. 1 to 3 differs from the set temperature thereof; in the first control area (I), the temperature of the glass in each of the zone Nos. 2 and 3 is subjected to a fuzzy inference based on a deviation between the measured temperature and the set temperature and a time-varying change amount of a difference between the currently measured temperature and the previously measured temperature with respect to the glass in the spout portion; in the second control area (II), the temperature of the glass in each of the zone Nos. 2 and 3 is subjected to a fuzzy inference based on a deviation between the measured temperature and the set temperature of the glass and the open degree of the burner valves in each of the zone Nos. 2 and 3; in the first control area (I), a change amount of the set temperature of the glass surface in each of the zone Nos. 2 and 3 is controlled; in the second control area (II), a change amount of the set temperature of the glass surface in each of the zone Nos. 2 and 3 is controlled.

32. The process as set forth in claim 16, wherein a first control area (I) and a second control area (II) are provided; in the first control area (I), the temperatures of the glass in the zone Nos. 2 and 3 are subjected to a fuzzy inference based on a deviation between the measured temperature and the set temperature of the glass in each of the zone Nos. 2 and 3, and the time-varying change amount between the currently measured temperature and the previously measured temperature of the glass in each of the zone Nos. 2 and 3; in the second control area (II), variations in temperatures and open degrees of burner and cooling valves are continuously outputted to the Proportional-Integral-Derivative controller when the temperature of the glass in each of zone Nos. 1 and 3 differs from the set temperature thereof; in the first control area (I), the temperature of the glass in each of the zone Nos. 2 and 3 is subjected to a fuzzy inference based on a deviation between the measured temperature and the set temperature and a time-varying change amount of a difference between the currently measured temperature and the previously measured temperature with respect to the glass in the spout portion; in the second control area (II), the temperature of the glass in each of the zone Nos. 2 and 3 is subjected to a fuzzy inference based on a deviation between the measured temperature and the set temperature of the glass and the open degree of the burner valves in each of the zone Nos. 2 and 3; in the first control area (I), a change amount of the set temperature of the glass surface in each of the zone Nos. 2 and 3 is controlled; in the second control area (II), a change amount of the set temperature of the glass surface in each of the zone Nos. 2 and 3 is controlled.

33. The process as set forth in claim 1, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

34. The process as set forth in claim 2, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

35. The process as set forth in claim 3, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

36. The process as set forth in claim 4, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

37. The process as set forth in claim 5, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

38. The process as set forth in claim 6, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

39. The process as set forth in claim 7, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

40. The process as set forth in claim 8, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

41. The process as set forth in claim 9, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

42. The process as set forth in claim 10, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

43. The process as set forth in claim 11, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

44. The process as set forth in claim 12, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

45. The process as set forth in claim 13, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

46. The process as set forth in claim 14, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

47. The process as set forth in claim 15, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

48. The process as set forth in claim 16, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

49. The process as set forth in claim 17, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

50. The process as set forth in claim 18, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

51. The process as set forth in claim 19, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

52. The process as set forth in claim 20, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

53. The process as set forth in claim 21, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

54. The process as set forth in claim 22, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

55. The process as set forth in claim 23, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

56. The process as set forth in claim 24, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

57. The process as set forth in claim 25, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

58. The process as set forth in claim 26, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

59. The process as set forth in claim 27, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

60. The process as set forth in claim 28, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

61. The process as set forth in claim 29, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

62. The process as set forth in claim 30, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

63. The process as set forth in claim 31, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

64. The process as set forth in claim 32, wherein cooling means are provided on opposite sides of each of the zone Nos. 2 and 3, respectively, and a fuzzy inference is effected based on a deviation between the open degree of the burner valves in each of the zones and appropriate open degree thereof, and a deviation between the measured temperature and the set temperature of the glass in each of the zone Nos. 2 and 3, whereby a change amount of the open degree of the cooling valve in each of the zone Nos. 2 and 3 is controlled.

* * * * *